US012578909B2

(12) United States Patent
Yang et al.

(10) Patent No.: US 12,578,909 B2
(45) Date of Patent: Mar. 17, 2026

(54) OPTICAL LINK SUPPORTING DISPLAY PORT

(71) Applicant: OPTICIS CO., LTD., Seongnam-si (KR)

(72) Inventors: Dong Pyeong Yang, Seongnam-si (KR); Doo Soo Ha, Songpa-gu (KR)

(73) Assignee: OPTICIS CO., LTD., Seongnam-si (KR)

( * ) Notice: Subject to any disclaimer, the term of this patent is extended or adjusted under 35 U.S.C. 154(b) by 139 days.

(21) Appl. No.: 18/400,064

(22) Filed: Dec. 29, 2023

(65) Prior Publication Data

US 2024/0220175 A1    Jul. 4, 2024

(30) Foreign Application Priority Data

Dec. 30, 2022   (KR) ......................... 10-2022-0191029
Dec. 30, 2022   (KR) ......................... 10-2022-0191030
Dec. 30, 2022   (KR) ......................... 10-2022-0191058

(51) Int. Cl.
*G06F 3/14*        (2006.01)
*H04B 10/25*       (2013.01)

(52) U.S. Cl.
CPC ............... *G06F 3/14* (2013.01); *H04B 10/25* (2013.01)

(58) Field of Classification Search
None
See application file for complete search history.

(56) References Cited

U.S. PATENT DOCUMENTS 8,059,673 B2   11/2011  Kobayashi
8,767,777 B2    7/2014  Kobayashi
(Continued)

FOREIGN PATENT DOCUMENTS

KR    2009-0006740 A     1/2009
KR    1020090006740      1/2009
(Continued)

OTHER PUBLICATIONS

Oh, Jaegeun, Seon Wook Kim, and Taejin Kim.; "Design issues and optimization in DisplayPort link layer implementation." In 2010 IEEE Asia Pacific Conference on Circuits and Systems, pp. 188-191. IEEE, 2010. (Year: 2010).*
(Continued)

*Primary Examiner* — Edward Martello
(74) *Attorney, Agent, or Firm* — NIXON PEABODY LLP; Jeffrey L. Costellia

(57)                ABSTRACT

Provided is an optical link. The optical link supports duplex communication of an auxiliary channel for transmitting, between a display source and a display sink, extended display configuration data (EDID) that is related to rendering of the display sink or display port configuration data (DPCD) related to setting of a main link. The optical link is capable of preventing a data transfer error despite a transmission delay or distortion due to non-linearity between an input and an output due to movement of the optical link by setting the main link to be optimized for the optical link, which is different from a request by the display sink with respect to setting of a training pattern, in link training between the display source and the display sink. According to the optical link according to the disclosure, in one-to-multi display in which a plurality of display sinks are connected to one display source, dislocation or instability of the arrangement of a plurality of screens, which may be caused by a change in a connection state of any one display sink, may be prevented, and after the display sink returns to a normal connection state, delay of a video output for the resetting of the main link may be prevented.

14 Claims, 24 Drawing Sheets

OPTICAL LINK

(56) References Cited

U.S. PATENT DOCUMENTS

| | | | | |
|---|---|---|---|---|
| 9,996,893 | B2 | 6/2018 | Lee et al. | |
| 2008/0008172 | A1* | 1/2008 | Kobayashi | G06F 3/14 |
| | | | | 370/389 |
| 2011/0267359 | A1* | 11/2011 | Redman | G06F 3/1438 |
| | | | | 345/502 |
| 2012/0257680 | A1* | 10/2012 | Dickens | H04N 21/43632 |
| | | | | 348/498 |
| 2016/0329030 | A1* | 11/2016 | Lee | G06T 1/20 |
| 2017/0242201 | A1 | 8/2017 | Ha et al. | |
| 2020/0105177 | A1* | 4/2020 | Choi | G09G 3/20 |
| 2021/0109561 | A1 | 4/2021 | Moon et al. | |
| 2022/0368864 | A1* | 11/2022 | Yu | H04N 7/0125 |
| 2023/0195677 | A1* | 6/2023 | Li | G06F 13/4068 |
| | | | | 710/313 |

FOREIGN PATENT DOCUMENTS

| | | |
|---|---|---|
| KR | 2016-0131673 A | 11/2016 |
| KR | 1020160131673 | 11/2016 |
| KR | 2017-0099654 A | 9/2017 |
| KR | 1020170099654 | 9/2017 |
| KR | 2018-0131286 A | 12/2018 |
| KR | 1020180131286 A | 12/2018 |
| KR | 2020-0037530 A | 4/2020 |
| KR | 1020200037530 | 4/2020 |
| KR | 1020210044468 | 4/2021 |

OTHER PUBLICATIONS

Korean Notice of Non Final Rejection for Application No. KR-10-2022-0191058, mailed Sep. 21, 2023 (7 pages).
Korean Notice of Non Final Rejection for Application No. 10-2022-0191029, mailed Dec. 11, 2023 (5 pages).
Korean Notice of Allowance for Application No. 2023-114448665, mailed Dec. 20, 2023 (2 pages).
Korean Notice of Allowance for Application No. 2023-114284708, mailed Dec. 19, 2023 (3 pages).
International Search Report for App. No. PCT/KR2023/021870, dated Mar. 27, 2024 (14 Pages).

* cited by examiner

FIG. 2

Symbol

Lane differential
driver

AUX Channel

AUXILIARY DATA differential
receiver

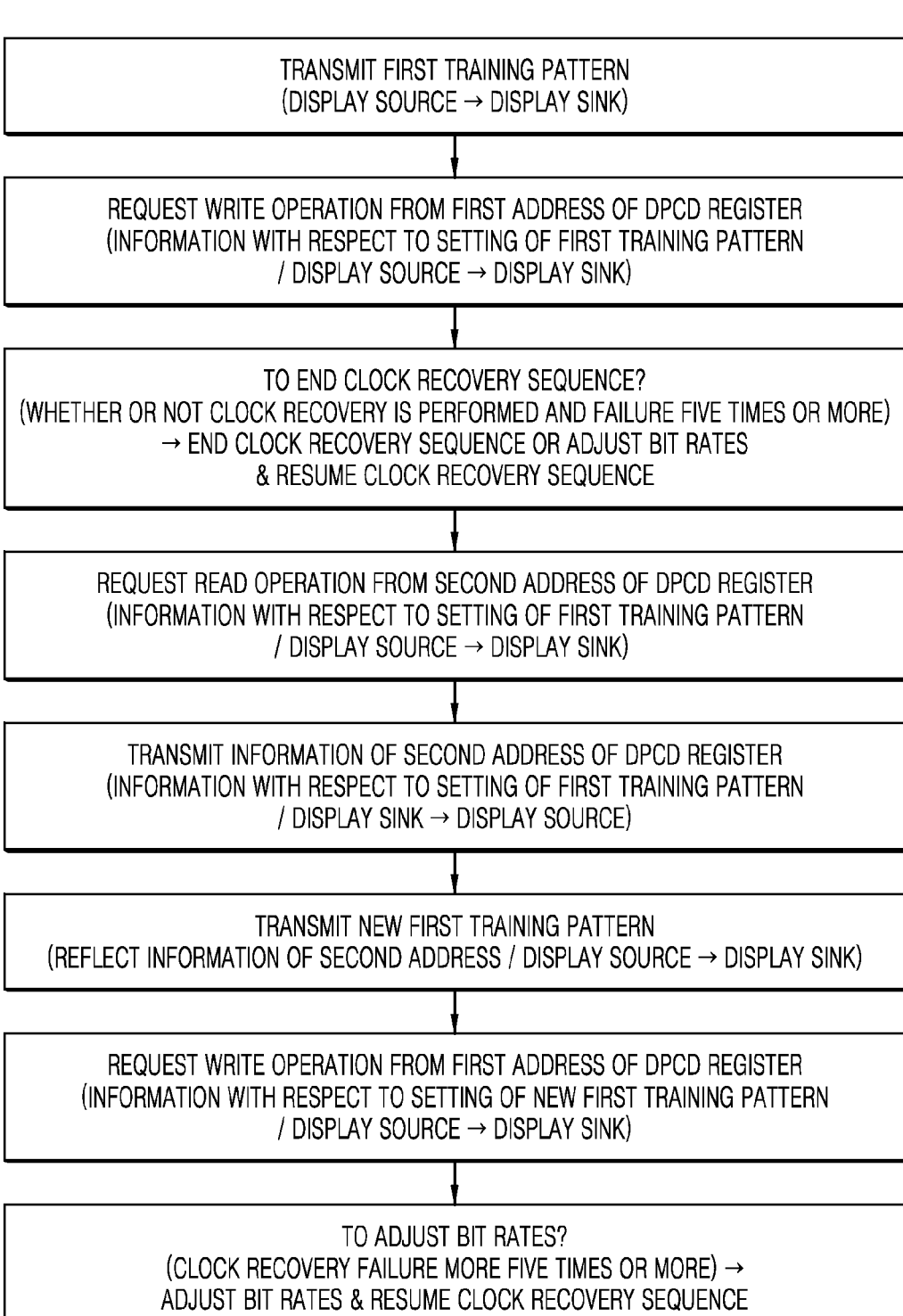

TRANSMIT FIRST TRAINING PATTERN
(DISPLAY SOURCE → DISPLAY SINK)

REQUEST WRITE OPERATION FROM FIRST ADDRESS OF DPCD REGISTER
(INFORMATION WITH RESPECT TO SETTING OF FIRST TRAINING PATTERN
/ DISPLAY SOURCE → DISPLAY SINK)

TO END CLOCK RECOVERY SEQUENCE?
(WHETHER OR NOT CLOCK RECOVERY IS PERFORMED AND FAILURE FIVE TIMES OR MORE)
→ END CLOCK RECOVERY SEQUENCE OR ADJUST BIT RATES
& RESUME CLOCK RECOVERY SEQUENCE

REQUEST READ OPERATION FROM SECOND ADDRESS OF DPCD REGISTER
(INFORMATION WITH RESPECT TO SETTING OF FIRST TRAINING PATTERN
/ DISPLAY SOURCE → DISPLAY SINK)

TRANSMIT INFORMATION OF SECOND ADDRESS OF DPCD REGISTER
(INFORMATION WITH RESPECT TO SETTING OF FIRST TRAINING PATTERN
/ DISPLAY SINK → DISPLAY SOURCE)

TRANSMIT NEW FIRST TRAINING PATTERN
(REFLECT INFORMATION OF SECOND ADDRESS / DISPLAY SOURCE → DISPLAY SINK)

REQUEST WRITE OPERATION FROM FIRST ADDRESS OF DPCD REGISTER
(INFORMATION WITH RESPECT TO SETTING OF NEW FIRST TRAINING PATTERN
/ DISPLAY SOURCE → DISPLAY SINK)

TO ADJUST BIT RATES?
(CLOCK RECOVERY FAILURE MORE FIVE TIMES OR MORE) →
ADJUST BIT RATES & RESUME CLOCK RECOVERY SEQUENCE

OPTICAL LINK SUPPORTING DISPLAY PORT

CROSS-REFERENCE TO RELATED APPLICATION

This application is based on and claims priority under 35 U.S.C. § 119 to Korean Patent Application Nos. 10-2022-0191029, filed on Dec. 30, 2022, 10-2022-0191030, filed on Dec. 30, 2022, and 10-2022-0191058, filed on Dec. 30, 2022, in the Korean Intellectual Property Office, the disclosures of which are incorporated by reference herein in their entireties.

BACKGROUND

1. Field

The disclosure relates to an optical link supporting a display port, and more particularly, to an optical link supporting a display port supporting duplex communication.

The disclosure relates to an optical link supporting a display port, and more particularly, to an optical link capable of implementing optimized setting of a main link.

The disclosure relates to an optical link supporting a display port, and more particularly, to an optical link capable of preventing instable screen arrangement due to a change of a connection state of a display source and preventing a delay due to re-setting of a main link.

2. Description of the Related Art

An optical link may provide an interface for optical communication between a source device for generating a video signal and a sink device for realizing a video image from the video signal received from the source device. The optical link may include a video signal line transmitting video data and an auxiliary signal line transmitting, in addition to the video data, auxiliary data with respect to setting information of the source device or the sink device.

SUMMARY

Provided is an optical link supporting duplex communication of an auxiliary channel for transmitting, between a display source and a display sink, extended display identification data (EDID) related to rendering of the display sink and display port configuration data (DPCD) with respect to setting of a main link.

Provided is an optical link capable of preventing a data transfer error despite a transmission delay or distortion due to non-linearity between an input and an output due to movement of the optical link, by setting a main link to be optimized for the optical link, which is different from a request by a display sink with respect to setting of a training pattern, in link training between a display source and the display sink.

Provided is an optical link capable of preventing dislocation or instability of screen arrangement due to a change in a connection state of a display sink and also capable of preventing a delay of a video output due to re-setting a main link after the display sink returns to a normal connection state.

Additional aspects will be set forth in part in the description which follows and, in part, will be apparent from the description, or may be learned by practice of the presented embodiments of the disclosure.

According to an aspect of the disclosure, there is provided an optical link connected between a display source and a display sink forming a display port system, the optical link forming a main link for transmitting main data including video information and an auxiliary channel for transmitting auxiliary data for setting of the main link, wherein the auxiliary channel includes: a first transmission line configured to transmit a request by the display source from the display source to the display sink, and a second transmission line configured to transmit a response by the display sink from the display sink to the display source, and the optical link is configured to: i) prior to the request by the display source, transmit a second control signal for switching a connection of the display sink from the second transmission line to the first transmission line; and ii) prior to the response by the display sink, transmit a first control signal for switching a connection of the display source from the first transmission line to the second transmission line.

According to another aspect of the disclosure, there is provided an optical link connected between a display source and a display sink forming a display port system, the optical link forming a main link for transmitting main data including video information and an auxiliary channel for transmitting auxiliary data for setting of the main link, wherein the optical link, with respect to the setting of the main link, is configured to: i) change a response by the display sink including first setting information with respect to a read request by the display source to second setting information which is different from the first setting information and transmit the second setting information to the display source as the response by the display sink; and ii) change a write request by the display source including the second setting information to the first setting information and transmit the first setting information to the display sink as the write request by the display source.

According to another aspect of the disclosure, there is provided an optical link connected between a display source and a display sink forming a display port system, the optical link forming a main link, an auxiliary channel, and a hot plug detection (HPD) line, wherein the main link is configured to transmit main data including video information, the auxiliary channel is configured to transmit auxiliary data related to rendering of the display sink and auxiliary data with respect to setting of the main link, and the HPD line is configured to transmit an HPD signal of the display sink, wherein the optical link is configured to store the auxiliary data related to the rendering of the display sink and the auxiliary data with respect to the setting of the main link, and when the HPD signal is recovered according to normal reconnection of the display sink after a change in the HPD signal according to a connection state of the display sink, transmit, to the display source or the display sink, the stored auxiliary data related to the rendering of the display sink and the stored auxiliary data with respect to the setting of the main link.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a block diagram of a structure of a display sink of a display port system;

FIGS. 11 and 12 illustrate an example of an auxiliary channel according to an embodiment, wherein each of FIGS. 11 and 12 illustrates a structure of a display source and a structure of a display sink;

FIGS. 14 and 15 are respectively flowcharts of a process of a clock recovery sequence and a process of a channel equalization sequence performed in link training for setting a main link;

FIGS. 19 and 20 are diagrams of a process of intervention between a display source and a display sink to change display port configuration data (DPCD) with respect to setting of a main link to optimized setting for an optical link, wherein FIGS. 19 and 20 are respectively diagrams of a process of changing setting of a training pattern in the case of an $n^{th}$ failure of channel equalization and a process of changing setting of a training pattern in the case of an $n+1^{th}$ failure of channel equalization;

DETAILED DESCRIPTION

Figure 1:
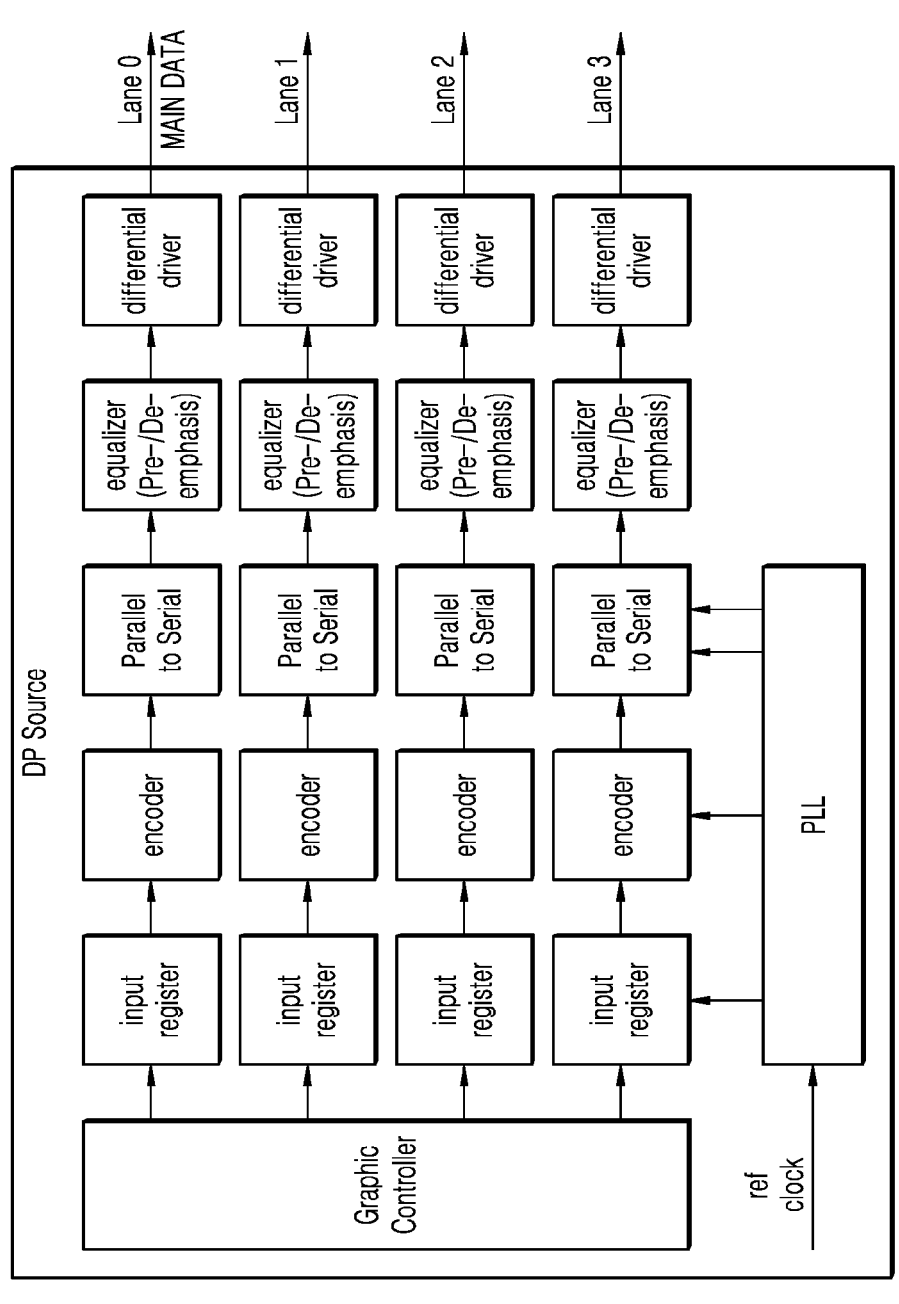
FIG. 1 is a block diagram of a structure of a display source of a display port system.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 2:
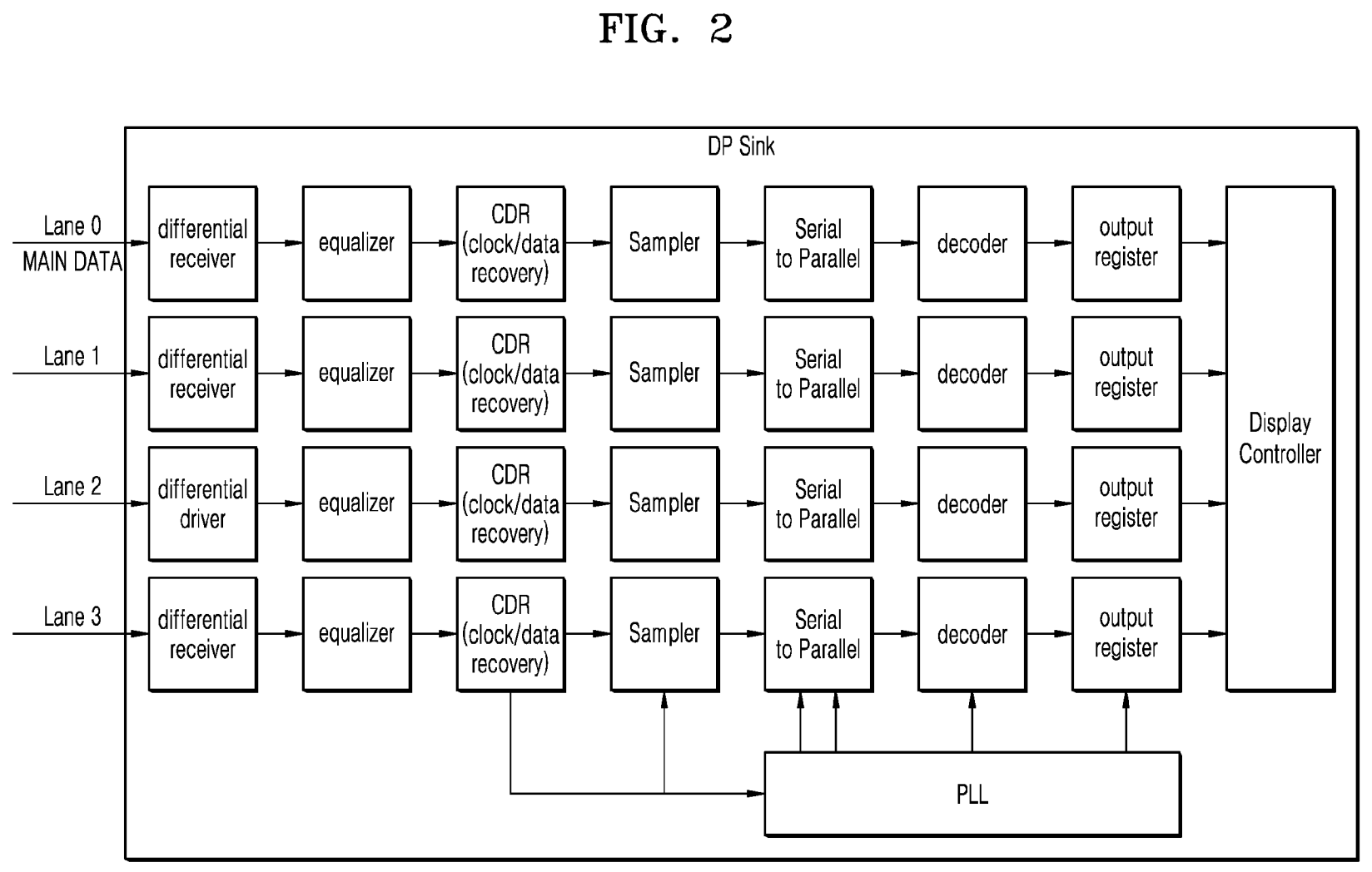
Figure 3:
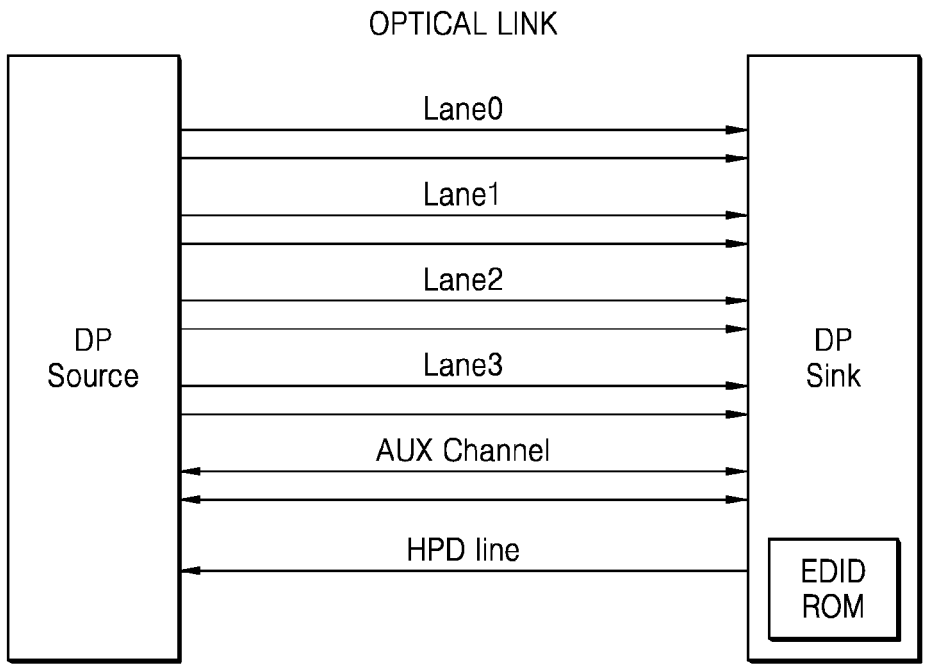
FIG. 3 is a diagram of a structure of an optical link mediating signal transmission between a display source and a display sink.

FIG. 1 is a block diagram of a structure of a display source of a display port system. FIG. 2 is a block diagram of a structure of a display sink of the display port system. FIG. 3 is a diagram of a structure of an optical link mediating signal transmission between a display source and a display sink.

Referring to FIGS. 1 to 3, the display port system may include a display source and a display sink connected to each other through an optical link, the display source and the display sink being configured to transmit and receive main data and auxiliary data to and from each other.

Referring to FIG. 1, the display source may include an input register configured to receive the main data from a graphics controller; an encoder configured to encode the main data that is output from the input register according to a parallel clock signal; and a shift register (or a serializer (parallel to serial)) configured to output a parallel signal of the main data that is input according to the parallel clock signal to a serial signal according to a serial clock signal. The encoder may line-encode and block-encode the main data, may achieve a direct current (DC) balance between a positive voltage and a negative voltage for preventing signal distortion due to a DC component, and may perform appropriate line encoding by considering synchronization between the display source and the display sink. Also, the encoder may convert, for example, an input of 8 bits into an output of 10 bits through block encoding, may achieve the DC balance between the positive voltage and the negative voltage through block encoding, and may identify a transfer error (a bit error) of data. For example, the input register, the encoder, and the shift register (parallel to serial) may be synchronized to one another with a parallel clock as an input, and the parallel clock may be output through a multiplier or a phase lock loop (PLL) using a reference clock as an input. The shift register (parallel to serial) may output the main data of the serial signal by using, as an input, a serial clock of a high frequency that is output through the multiplier or the PLL using the reference clock as the input. For example, the serial clock may be output as a bit rate corresponding to a multiple of the parallel clock.

The display source may include a packetizer or a scrambler connected to a back end of the graphics controller. For example, the packetizer may be configured to generate a header including address information of the display sink receiving the main data, and the scrambler may be configured not to allow continual arrival of a low signal and a high signal in order for the display sink not to lose synchronization and may be configured to achieve a DC balance between a positive voltage and a negative voltage.

Figure 4:
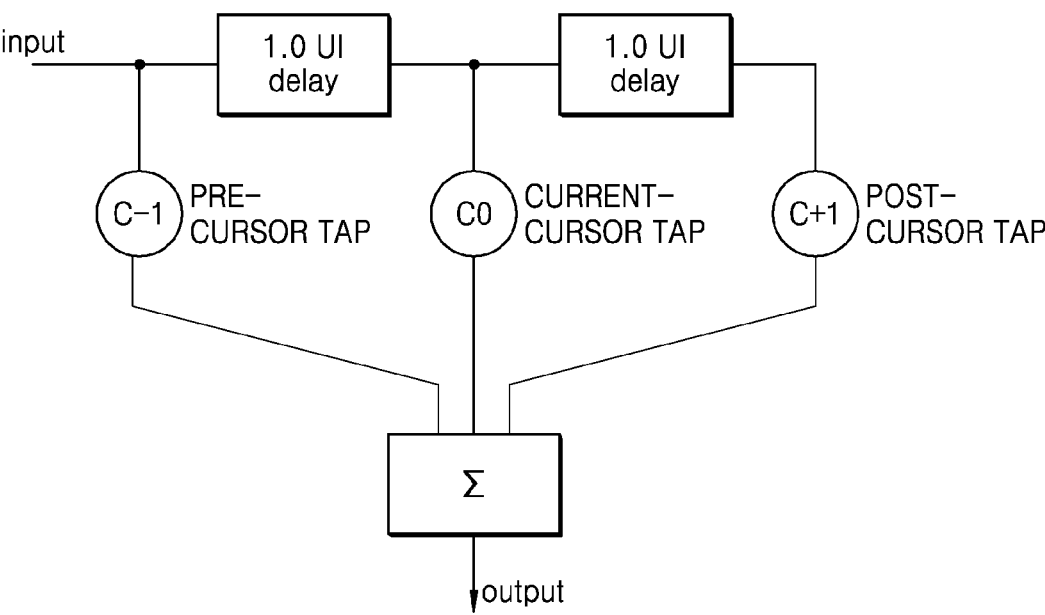
FIG. 4 is a schematic diagram of a finite impulse response (FIR) filter, which is an example of an equalizer, according to an embodiment.

FIG. 4 is a schematic diagram of a finite impulse response (FIR) filter, which is an example of an equalizer, according to an embodiment.

Figure 5:
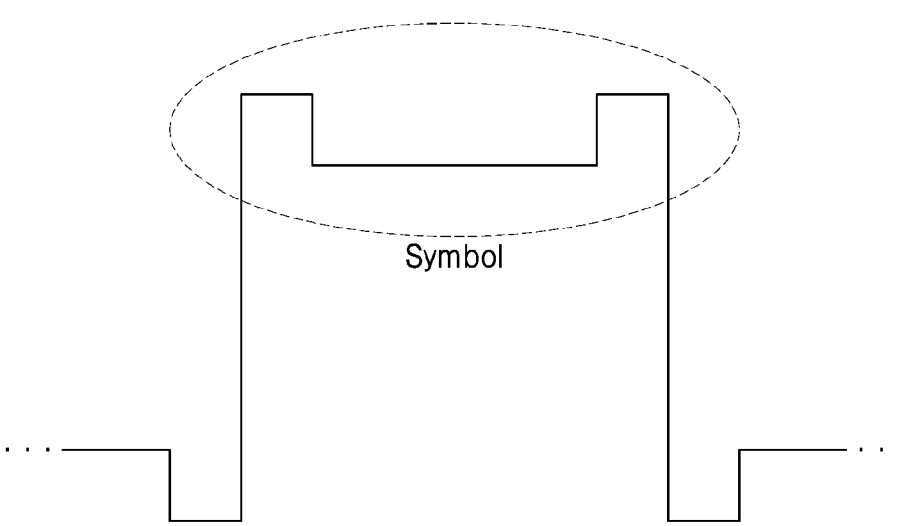
FIG. 5 is a schematic diagram of pre-emphasis or de-emphasis formed at the front or back end of a symbol through an equalizer, according to an embodiment.

FIG. 5 is a schematic diagram of pre-emphasis or de-emphasis formed at the front or back end of a symbol through an equalizer, according to an embodiment.

The display source may include an equalizer (a feed forward equalizer (FFE)) connected to a back end of the shift register (or the serializer (parallel to serial)). The equalizer (the FFE) may also be referred to as pre-emphasis or de-emphasis and may be configured to resolve the problem of a high-speed serial link, for which a receiving end may have difficulty sensing a signal, as a peak of the signal is reduced and a width of the signal is increased due to transmission signal distortion, inter-symbol interference (ISI), delay distribution, and non-correspondence of impedance. The configuration of the equalizer (the FFE) may take into account an increase in pulse width by delaying an input signal by one unit interval (1 UI) and inverting the input signal, and then, adding applied weight values C−1, CO, and C+1 to an initial input signal. For example, according to an embodiment, the equalizer may include a three-tap finite impulse response (FIR) filter including a pre-cursor tap C−1, a post-cursor tap C+1, and a current-cursor tap CO processing pre-cursor ISI, post-cursor ISI, and current-cursor ISI, respectively. The equalizer may intentionally generate a distortion signal to include pre-emphasis or de-emphasis of an appropriate magnitude by predicting loss occurring in the high-speed link.

Figure 6:
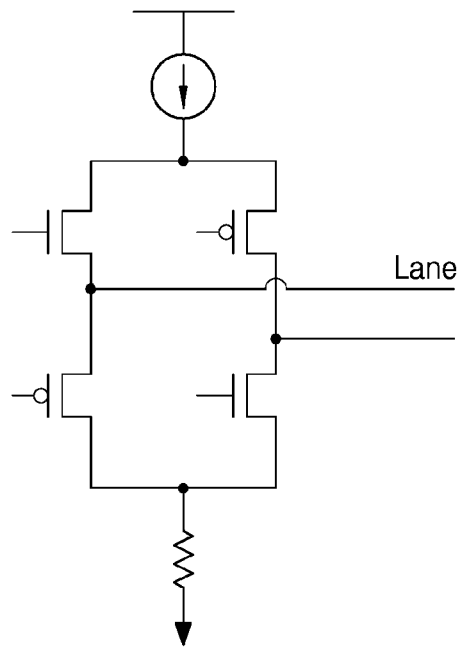
FIGS. 6 and 7 illustrate examples of a differential driver and a differential receiver, respectively, according to an embodiment.
Figure 7:
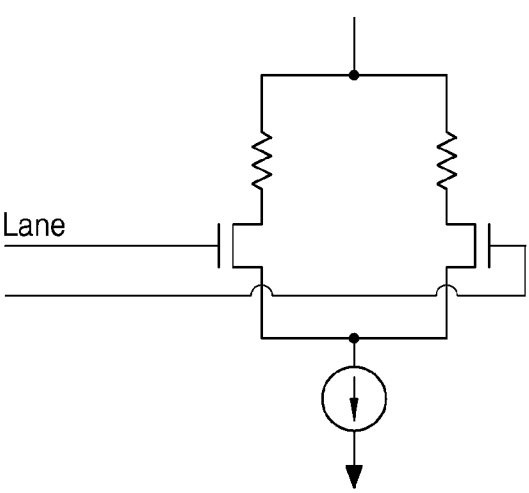

FIGS. 6 and 7 illustrate examples of a differential driver and a differential receiver, respectively, according to an embodiment.

Referring to FIGS. 1 and 6, the differential driver may be connected to a back end of the equalizer (the FFE). The differential driver may be configured to output a differential signal by using a single-ended signal as an input and to offset the noise intervening in a main data signal to a common mode voltage by transmitting main data transmitted through a main link Lane through the differential signal. According to an embodiment, the differential driver may include a differential pair connected to each other in parallel, for example, a push pull pair connected to each other in series or in parallel between a bipolar junction transistor (BJT) of an open collector or a field-effect transistor (FET) of an open drain and a pull-up resistor. Also, the differential driver may include a serial connection of a current source for a constant differential output in which the effect of the common mode voltage is offset.

Referring to FIGS. 2 and 7, the display sink may include the differential receiver configured to output main data of a single-ended signal by using, as an input, main data of a differential signal received through the main link Lane. According to an embodiment, the differential receiver may include a differential amplifier and may be configured to output the main data of the differential signal transmitted through the main link Lane as the main data of the single-ended signal.

Referring to FIG. 2, an equalizer may be connected to a back end of the differential receiver. Also, according to an embodiment, an equalizer of a low pass filter may be connected, and a linear low pass filter such as continuous time linear equalization (CTLE) may be applied to amplify a high-frequency component of the main data.

Figure 8:
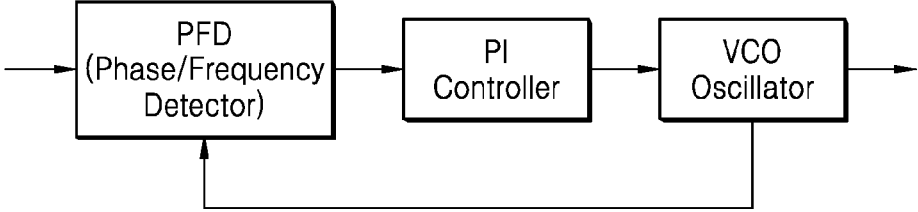
FIG. 8 illustrates an example of clock and data recovery (CDR), according to an embodiment.

FIG. 8 illustrates an example of clock and data recovery (CDR), according to an embodiment.

Referring to FIGS. 2 and 8, the CDR may be connected to a back end of the equalizer, and the CDR may include a phase frequency detector (PFD), a proportional integral (PI) controller, and a voltage controlled oscillator (VCO), wherein the PFD may include an XOR gate, etc. to detect an error component corresponding to a difference between a frequency of the main data and a frequency that is output from the VCO, the PI controller may output a control signal by using, as an input, the error component corresponding to the difference of the frequency that is output from the PFD, and the VCO may output a signal of a frequency increasing or decreasing according to the control signal output from the PI controller. For example, the VCO may output a frequency proportionate to a voltage corresponding to the control signal input from the PI controller. The CDR may be controlled by PI-feedback such that the difference between the frequency of the main data that is input and the frequency generated from the VCO is reduced, and thus, may generate a stable clock signal by having a frequency matching that of the main data from the VCO.

Referring to FIG. 2, a sampler configured to quantize a signal of the main data into binarized data of a low signal and a high signal by using a recovered clock signal, may be connected to a back end of the CDR.

The display sink may include a shift register (or a deserializer (serial to parallel)) connected to a back end of the sampler and configured to sequentially receive a serial signal of main data according to a serial clock and output a parallel signal of the main data according to a parallel clock, a decoder configured to decode the main data that is output from the shift register (serial to parallel), and an output register configured to output the decoded main data to a display controller according to the parallel clock. The decoder may be matched with an encoder of a transmission end and may perform inverse transformation such as line encoding and block encoding via the encoder, to, for example, convert the main data of 10 bits to the main data of 8 bits. For example, the shift register (serial to parallel) may sequentially receive the main data by using, as a serial clock, a clock signal recovered by the CDR or by using, as a serial clock, a clock signal that is output from the PLL by using, as an input, the clock signal recovered by the CDR. Also, the shift register (serial to parallel), the decoder, and the output register may be synchronized to one another by using a parallel clock as an input. For example, the shift register (serial to parallel) the decoder, and the output register may generate the parallel clock and the serial clock by using the clock signal recovered by the CDR and may generate the parallel clock and the serial clock through a circuit for frequency conversion, such as the PLL, etc. According to various embodiments, the display sink may further include a descrambler matching the scrambler at the display source.

Referring to FIG. 3, the main link Lane connected between the display source and the display sink may transmit the main data, and according to an embodiment, the main data transmitted through the main link Lane may include a video signal and an audio signal and, in addition thereto, may further include a horizontal synchronization signal, a vertical synchronization signal, etc. However, as described below, that the main link transmits the video signal and the audio signal may not denote that the video signal and the audio signal are transmitted through separate main links Lanes 0 to 3 included in the main link Lane. Rather, for example, a display port may process the video signal and the audio signal into a packet form and may distribute the video signal and the audio signal to the main links Lanes 0 to 3 included in the main link Lane. More detailed aspects with respect to the main link Lane and the main data transmitted through the main link Lane are to be described below.

Figure 9:
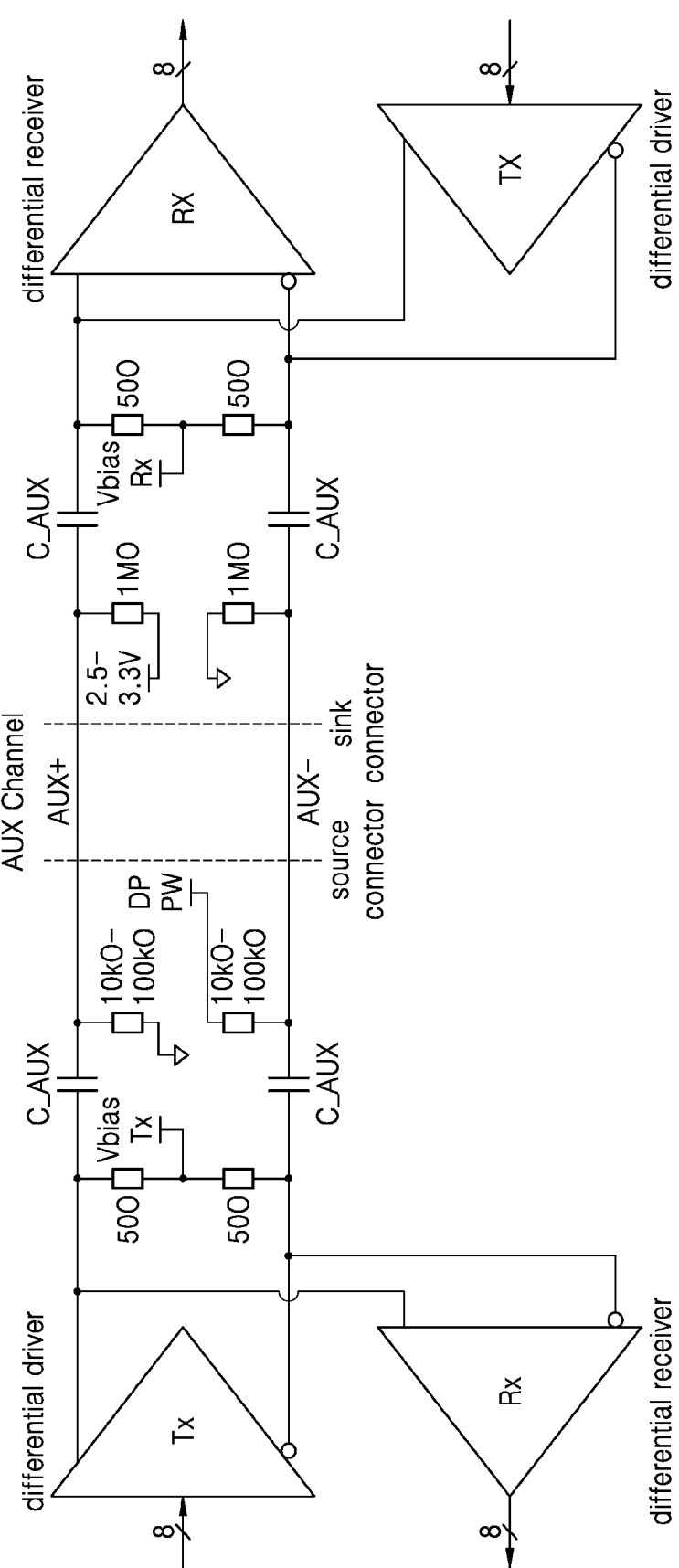
FIG. 9 illustrates an example of an auxiliary channel.

FIG. 9 illustrates an example of an auxiliary channel.

Figure 10:
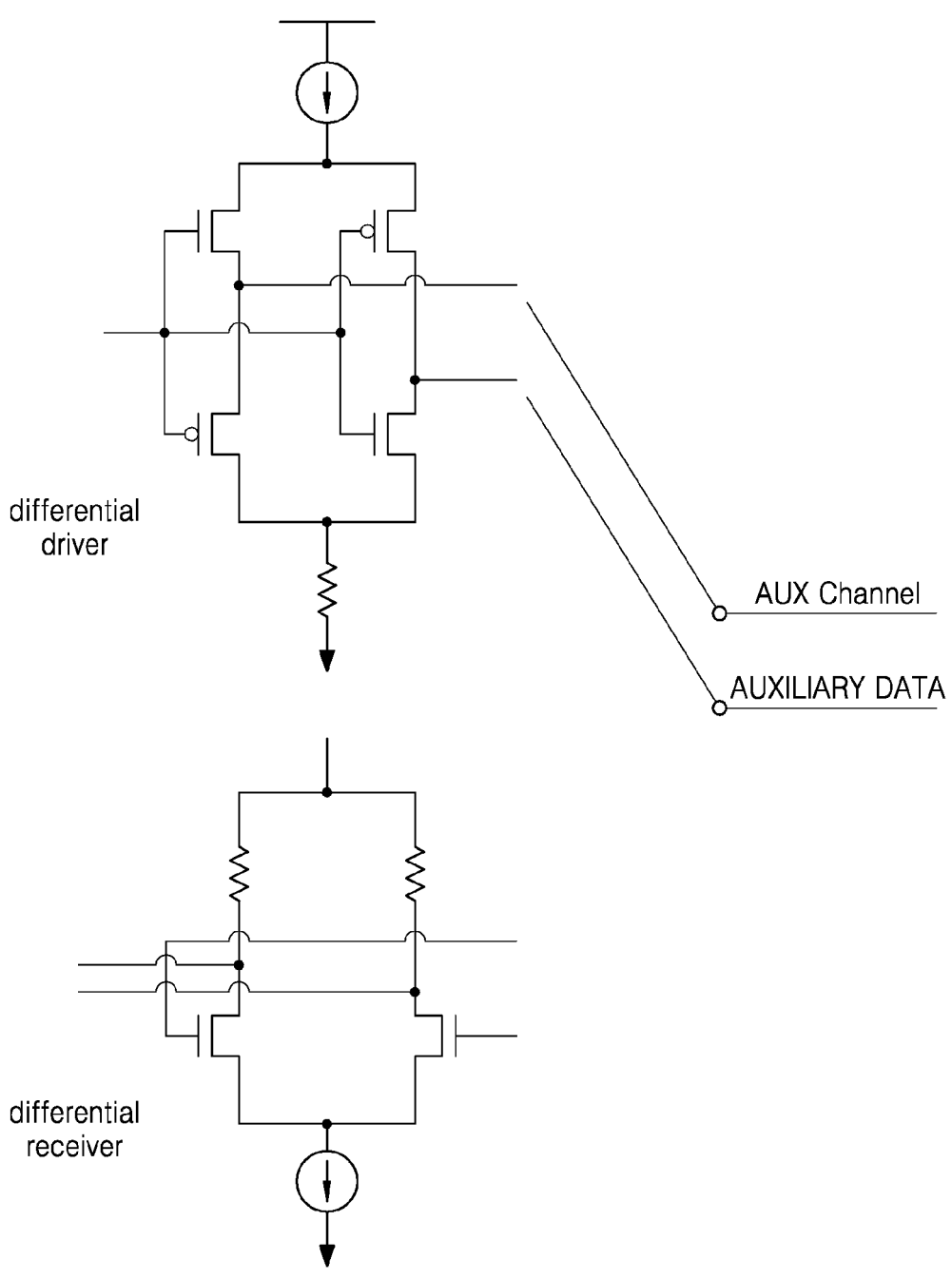
FIG. 10 illustrates an example of a differential driver and a differential receiver that are illustrated in FIG. 9.

FIG. 10 illustrates an example of a differential driver and a differential receiver that are illustrated in FIG. 9.

An auxiliary channel AUX channel for transmitting auxiliary data for the setting, management, or the like of the main link Lane may be connected between the display source and the display sink. The structure of the display source and the display sink described above may be connected to the main link Lane transmitting the main data. Hereinafter, the structure of the display source and the display sink connected to the auxiliary channel AUX channel transmitting the auxiliary data are to be described.

The display source may include a differential driver configured to output, as a differential signal, auxiliary data of a single-ended signal which is input from a graphics controller or control elements other than the graphics controller. The differential driver may include a differential pair connected to each other in parallel, for example, a push pull pair connected to each other in series or in parallel between a BJT of an open collector or an FET of an open drain and a pull-up resistor. Also, the differential driver may include a serial connection of a current source for a constant differential output in which the effect of the common mode voltage is offset.

The display source may include a differential receiver connected to the auxiliary channel AUX channel together with the differential driver, and according to an embodiment, the differential receiver may include a differential amplifier and may output the auxiliary data of a differential signal transmitted through the auxiliary channel AUX channel as the auxiliary data of the single-ended signal. For example, the differential driver and the differential receiver may together form a differential processor. With respect to the auxiliary data transmitted through the auxiliary channel AUX channel, the differential processor may output a differential signal by using a single-ended signal as an input or may output the single-ended signal by using the differential signal as an input. For example, according to an embodiment, the differential driver and the differential receiver may be connected to the auxiliary channel AUX channel through a conversion switch, and the conversion switch may selectively connect any one of the differential driver and the differential receiver to the auxiliary channel AUX channel according to a control signal. The control signal input to the conversion switch may be output from the graphics controller or other control elements, and according to the control signal input to the conversion switch, the auxiliary data may be transmitted by the display source as a transmission end or the auxiliary data may be received by the display source as a reception end. Also, through an input of the control signal to the conversion switch, a transmission end and a reception end of the display device (the display source and the display sink) may be switched.

Unlike the main link Lane, the auxiliary channel AUX channel may transmit the auxiliary data bi-directionally between the display source and the display sink, and thus, each of the display source and the display sink which are connected to the auxiliary channel AUX channel may function as a transmission end or a reception end. Thus, according to an embodiment, unlike the main link Lane, each of the display source and the display sink which are connected to the auxiliary channel AUX channel may include the differential processor including the differential driver and the differential receiver.

Referring to FIG. 3, according to an embodiment, the main link Lane may unidirectionally transmit the main data between the display source and the display sink. That is, the main link Lane may transmit the main data in a uni-direction from the display source to the display sink. Accordingly, the display source and the display sink that are connected to the main link Lane may function as the transmission end and the reception end, respectively.

As described above, according to an embodiment, the display source and the display sink which are connected to the auxiliary channel AUX channel may function as a transmission end transmitting the auxiliary data and a reception end receiving the auxiliary data, respectively, and thus, may have substantially the same structure as the display source and the display sink connected to the main link Lane.

For example, according to an embodiment, the display sink may include the differential driver configured to output the auxiliary data of the single-ended signal that is input from the display controller or control elements other than the display controller as the differential signal and inversely, may include the differential receiver configured to output the auxiliary data of the differential signal transmitted through the auxiliary channel AUX channel as the auxiliary data of the single-ended signal, wherein the differential driver and the differential receiver may be connected to the auxiliary channel AUX channel through the conversion switch. Also, the conversion switch may selectively connect any one of the differential driver and the differential receiver to the auxiliary channel AUX channel according to a control signal that is input to the conversion switch. For example, the differential driver and the differential receiver may together form the differential processor. More detailed aspects with respect to the auxiliary channel AUX channel and the auxiliary data transmitted through the auxiliary channel AUX channel are to be described below.

Referring to FIG. 3, the display port may include the main link Lane for transmitting data and the auxiliary channel AUX channel for controlling/managing the link and the device. Also, in addition to the main link Lane and the auxiliary channel AUX channel, the display port may further include a hot plug detection (HPD) line supporting a hot plug function.

The main link Lane may transmit the main data such as a video signal and an audio signal, and while the display port may be a display interface as a high-definition multimedia interface (HDMI), the display port, unlike the HDMI, may not seamlessly transmit data by a constant transmission rate between the display source and the display sink through a continual flow of data and may transmit data in the form of a packet in a certain format. As described above, the display port may transmit data in a packet form, and thus, multi-displays in which a plurality of display sinks (display devices) are connected may be easily supported and in a multi-display environment, a plurality of data signals transmitted to the plurality of display sinks may be transmitted in a mixed state. Also, a hub in the middle may transmit each of packets to a display sink linked with address information included in each packet, by referring to, for example, the address information of a packet header.

In the main link Lane of the display port, each main link Lane 0, Lane 1, Lane 2, or Lane 3 may not take charge of transmitting data assigned thereto, such as R data, G data, B data, or pixel clock data, like in the case of an HDMI. Rather, the main link Lane of the display port may transmit data in a packet form. For example, according to a specific embodiment, the number of main links Lanes may be selected from among 1, 2 or 4. According to an embodiment, the main link Lane of the display port may include the total of four main links including a main link Lane 0, a main link Lane 1, a main link Lane 2, and a main link Lane 3, and a video signal, an audio signal, etc. may be processed in a packet form and may be evenly distributed and transmitted through the four main links Lanes 0 to 3. That is, for example, the R data, the G data, and the B data may be transmitted through all of the four main links Lanes 0 to 3. For example, in the main data, the video data, such as the R data, the G data, and the B data may occupy most sections of the packet, and the audio data may be transmitted during a vertical synchronization section where there is no video data. As described above, according to an embodiment, the display port may not include additional main links Lanes 0 to 3 to transmit a clock signal, and the clock signal for synchronization between the display source and the display sink may be recovered from the main data through the CDR of the display sink.

The main link Lane may transmit the main data in the uni-direction from the display source to the display sink and may transmit the data by using the differential signal, but may not use transition minimized differential signaling (TMDS) or low voltage differential signaling (LVDS) as in the HDMI.

The auxiliary channel AUX channel may transmit the auxiliary data for controlling/managing the link and the device and may transmit the auxiliary data in the bi-directions between the display source and the display sink. For example, the auxiliary channel AUX channel may bi-directionally transmit the auxiliary data in a half-duplex method. The auxiliary channel AUX channel may not communicate in an inter-integrated circuit (I2C) method and may communicate by using a differential signal. As described above, each of the display source and the display sink may include the differential processor including the differential driver and the differential receiver and may output the input single-ended signal as the differential signal or inversely, may output the input differential signal as the single-ended signal.

As illustrated in FIG. 9, the auxiliary channel AUX channel may include an AUX+ signal line and an AUX– signal line and may transmit a differential signal constantly maintaining a peak-to-peak voltage. The AUX+ signal line and the AUX– signal line may include two termination resistances 50 Ohm, unlike the LVDS including a single termination resistance. According to an embodiment, a bias voltage Vbias Tx between the AUX+ signal line and the AUX– signal line forming a differential voltage at the display source (the transmitter Tx) may be different from a bias voltage Vbias Rx between the AUX+ signal line and the AUX– signal line forming a differential voltage at the display sink (the receiver Rx). Here, a decoupling capacitor C_AUX providing AC-coupling between two termination resistances to connect the different bias voltages or different common mode voltages between the transmitter Tx and the receiver Rx may be connected to the AUX+ signal line and the AUX– signal line, and the decoupling capacitor C_AUX may remove the noise of a DC component in the auxiliary channel AUX channel.

Through the auxiliary channel AUX channel, extended display identification data (EDID) of the display sink may be obtained to identify rendering data of the display sink such as a resolution and a scan rate, a high bandwidth digital content protection (HDCP) key may be exchanged to identify a video content protection-related function, and a value of a display port configuration data (DPCD) register may be obtained to identify information related to the setting of the main link Lane. For example, when a cable is connected to the display port and the connection is sensed from the display sink through an HPD line, the EDID and the DPCD values may be read through the auxiliary channel AUX channel, and based on this information, the display source may set an appropriate main link Lane, and at the same time, may perform link training, which is a process in which a training pattern is transmitted through the main link Lane and whether or not the display sink has successfully received the training pattern is identified. Through this link training, the display source may determine an optimal transmission method, and when the link training is ended, may subsequently transmit main data such a video signal and an audio signal through the main link Lane.

The HPD line may transmit an HPD signal in the uni-direction from the display sink to the display source. The HPD signal may include all of a signal to notify that the display sink senses the connection of a cable, an interrupt signal to request the return to an initial stage and re-setting of the link when the state of the display sink is changed or the data is not properly received, etc.

Figure 11:
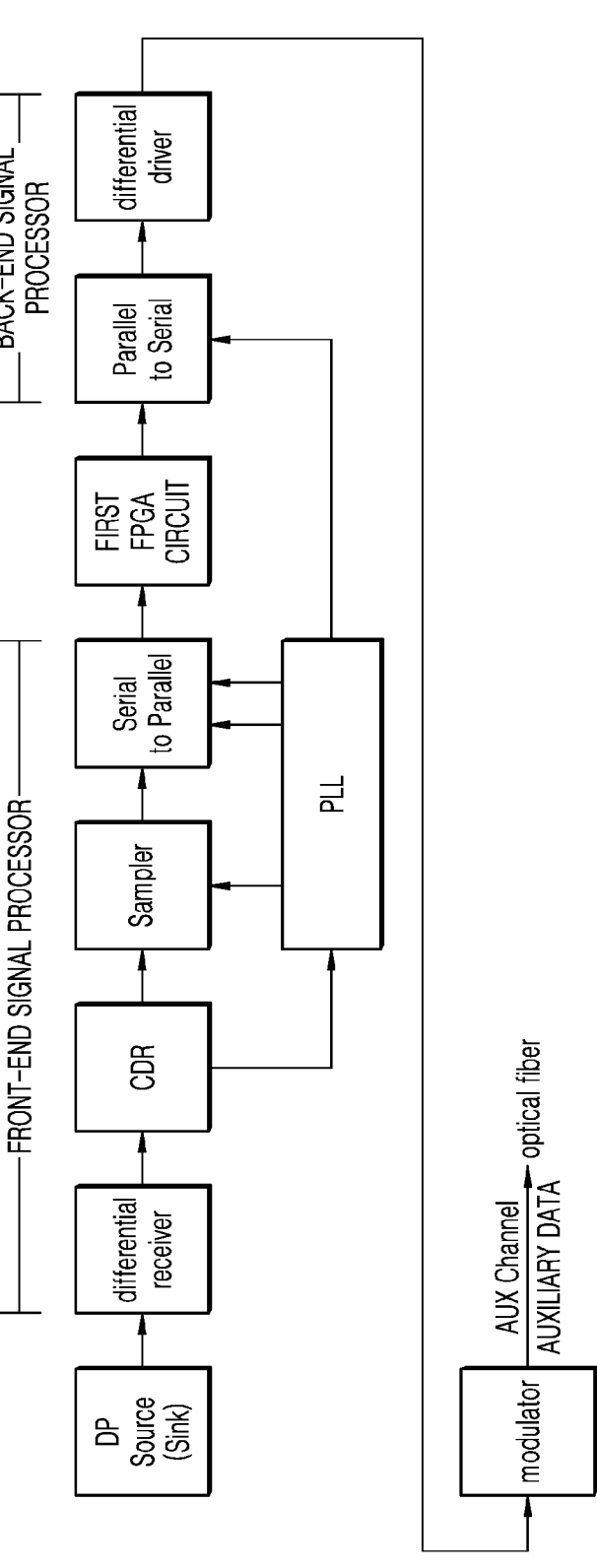
Figure 12:
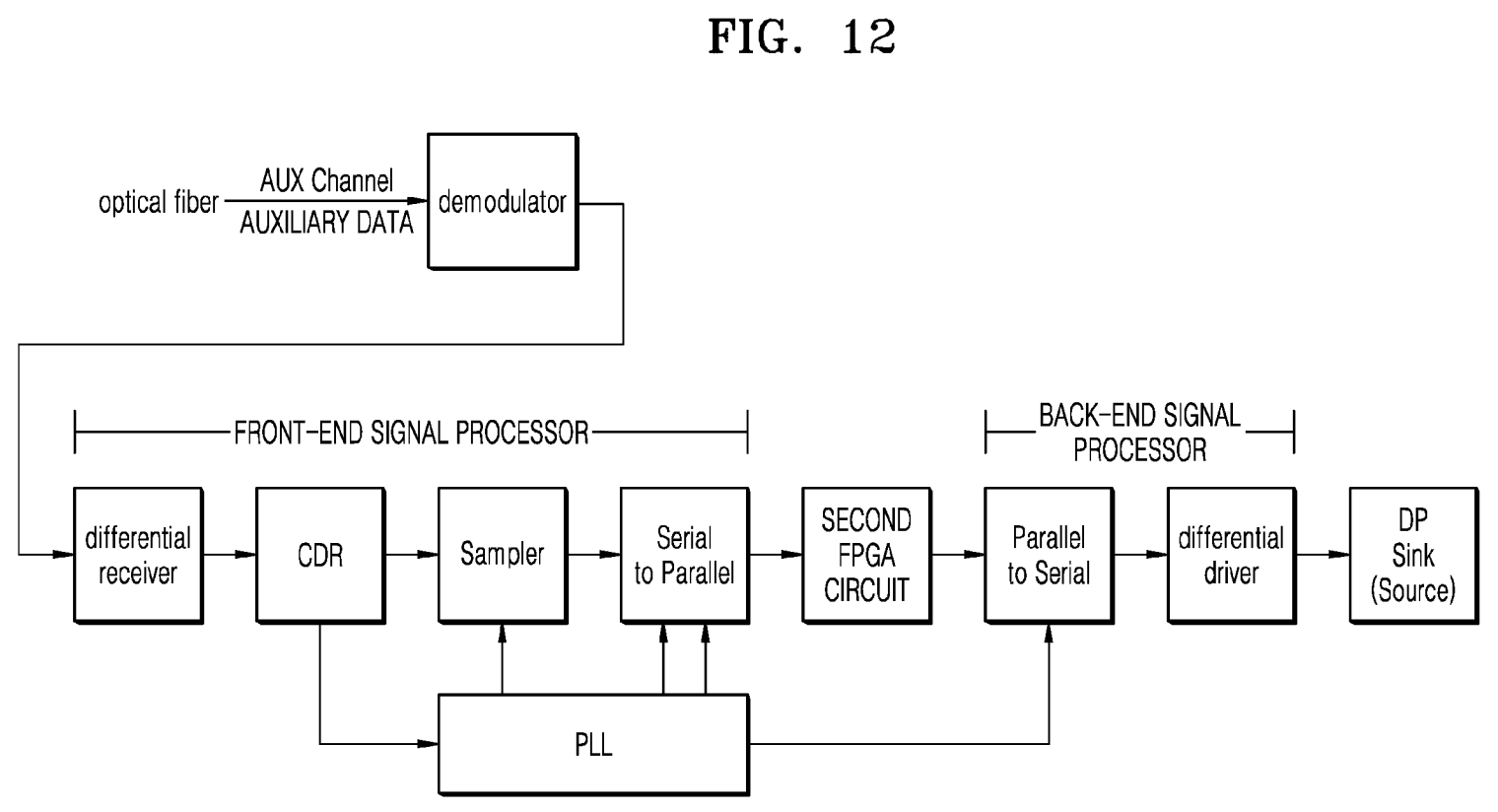

FIGS. 11 and 12 illustrate an example of an auxiliary channel according to an embodiment, wherein each of FIGS. 11 and 12 illustrates a structure of a display source and a structure of a display sink.

Referring to FIGS. 3 and 11, according to an embodiment, an optical link mediating data communication between the display source and the display sink may be included between the display source and the display sink. The optical link may form the main link Lane and the auxiliary channel AUX channel between the display source and the display sink and may include an optical fiber for transmitting the main data and the auxiliary data, thereby providing optical communication between the display source and the display sink. The optical link may include photoelectric transformers at both ends thereof and the optical fiber connecting the photoelectric transformers, wherein the photoelectric transformers may include a modulator configured to output an optical signal by using an electrical signal as an input and inversely, a demodulator configured to output an electrical signal by using an optical signal as an input. Here, the photoelectric transformers may include a first photoelectric transformer (the modulator) and a second photoelectric transformer (the demodulator) formed to be adjacent to the display source and the display sink, respectively. The first photoelectric transformer (the modulator) may be adjacent to the display source and connected to the display source through a conductive line, and the second photoelectric transformer (the demodulator) may be adjacent to the display sink and connected to the display sink through a conductive line.

After the main data transmitted through the main link Lane is transformed into an optical signal through the first photoelectric transformer (the modulator), the main data may be transmitted through the optical fiber and may be transformed again into an electrical signal through the second photoelectric transformer (the demodulator). Similarly, after the auxiliary data transmitted through the auxiliary channel AUX channel is transformed into an optical signal through the first photoelectric transformer (the modulator), the auxiliary data may be transmitted through the optical fiber and may be transformed again into an electrical signal through the second photoelectric transformer (the demodulator).

According to an embodiment, a field-programmable gate array (FPGA) circuit may be connected to the auxiliary channel AUX channel of the optical link. According to an embodiment, the FPGA circuit may not be connected to the main link Lane and may be selectively connected only to the auxiliary channel AUX channel. The FPGA circuit may include a first FPGA circuit connected to be adjacent to the display source and a second FPGA circuit connected to be adjacent to the display sink, and the main link Lane may bypass the FPGA circuit and the main data may be transmitted from the display source to the display sink without passing through the FPGA circuit.

The FPGA circuit may be involved in the link training for setting the main link Lane and may change setting of the main link Lane to be optimized for the optical link or may transmit an HPD signal corresponding to a normal connection environment of the display sink, despite a change of an HPD signal according to a change in the connection environment of the display sink, so that the display source may not be allowed to resume hand shaking including a request for the EDID information and a transmission thereof in response to the request or link training including a request for the DPCD information and a transmission thereof in response to the request. Also, when the hand shaking or the link training is resumed as the display sink returns to a normal connection condition, the FPGA circuit may be directly involved in the setting or managing of the main link Lane by, for example, storing relevant data such as the EDID information and the DPCD information and transmitting the same. As described above, according to an embodiment, the FPGA circuit may have to read the auxiliary data transmitted between the display source and the display sink and store the content of the auxiliary data or may have to replace part of the auxiliary data, and to this end, the optical link may include a front-end signal processor and a back-end signal processor at front and back ends of the FPGA circuit. According to an embodiment, the meaning of the term "front" or "back" is related to a signal transmission direction, and like the term "front end" or "back end," the term indicates a front or back direction with respect to the FPGA circuit, and in particular, does not limit the connection position of signal processor. For example, the optical link may include a front-end signal processor, the first FPGA circuit, and a back-end signal processor, which are connected to be adjacent to the display source in a direction of a request signal transmitted from the display source, and similarly, the optical link may include the front-end signal processor, the second FPGA circuit, and the back-end signal processor, which are connected to be adjacent to the display sink in the direction of the request signal transmitted from the display source. FIGS. 11 and 12 illustrate the structure for processing the request signal transmitted from the display source, and the structure for processing a response signal transmitted from the display sink may be the reverse with respect to the structure illustrated in FIGS. 11 and 12.

According to an embodiment, the front-end signal processor may include the differential receiver configured to output the auxiliary data of the single-ended signal by using the auxiliary data of the differential signal transmitted from the display source or the display sink as an input. For example, according to an embodiment, the differential receiver may include the differential amplifier.

To the back end of the differential receiver, the CDR configured to recover the clock signal for synchronization with the display source or the display sink transmitting the auxiliary data may be connected. The CDR may include a PFD including an XOR gate, etc. to detect an error component corresponding to a difference between a frequency of the auxiliary data and a frequency output from a VCO, a PI controller configured to output a control signal by using, as an input, the error component corresponding to the difference of the frequency output from the PFD, and the VCO configured to output a signal of a frequency increasing or decreasing according to the control signal output from the PI controller. Also, to the back end of the CDR, the sampler configured to quantize the signal of the auxiliary data into binarized data of a low signal and a high signal by using the recovered clock signal may be connected. As described above, the binarized auxiliary data of the low signal and the high signal may be recognized through the FPGA circuit. For example, corresponding types of the auxiliary data, that is, different types of auxiliary data, such as "request"/"reply" (a request from the display source/and a response from the display sink) and "read"/"write" (a read request from the display source/a write request from the display source, may be separately recognized, and data included in the auxiliary data may be read.

The front-end signal processor may include the shift register (or deserializer (serial to parallel)) connected to the back end of the sampler and configured to sequentially receive a serial signal of the auxiliary data according to a serial clock and output a parallel signal of the auxiliary data according to a parallel clock. For example, the shift register (serial to parallel) may sequentially receive the auxiliary data by using the clock signal recovered by the CDR as the serial clock or by using, as the serial clock, a clock signal that is output from the PLL by using, as an input, the clock signal recovered by the CDR. Also, the shift register may generate the parallel clock by using the clock signal recovered by the CDR and may generate the parallel clock through the circuit for frequency conversion such as the PLL. The FPGA circuit may read the auxiliary data of the parallel signal output from the shift register (serial to parallel) and may separately recognize the "request" from the display source and the "reply" from the display sink. Also, the FPGA may separately recognize a "read" request and a "write" request from the "request" from the display source and may recognize data corresponding to the "request" from the display source and the "reply" from the display sink. As described below, in the link training for optimally setting the main link Lane, the FPGA circuit may read the request from the display source and the response from the display sink, and the FPGA circuit may replace the information of the DPCD register (the request by the display sink with respect to setting of a training pattern) transmitted from the display sink in response to the "read" request by the display source, with data for optimization of the optical link, and may replace the information of the DPCD register in response to the "write" request by the display source, with information initially requested by the display sink. Also, according to an embodiment, the operation processor may analyze the auxiliary data to divide the two types, which are the request received from the display source and the response received from the display sink, and may transmit, to the partner of communication, first and second control signals for receiving the corresponding auxiliary data based on the request or the response, and thus, may full duplex the auxiliary channel AUX channel, rather than half-duplexing the auxiliary channel AUX channel. More detailed aspects with respect to these technical configurations will be described below.

The back-end signal processor may be connected to the back end of the FPGA circuit. The back-end signal processor may include the shift register (or the serializer (parallel to serial)) configured to output a parallel signal of the auxiliary data that is input according to a parallel clock as a serial signal according to a serial clock and may include the differential driver connected to the back end of the shift register (or the serializer (parallel to serial)). The differential driver may be configured to output a differential signal by using a single-ended signal as an input. The differential driver include a differential pair connected to each other in parallel, for example, a push pull pair connected to each other in series or in parallel between a BJT of an open collector or an FET of an open drain and a pull-up resistor. Also, the differential driver may include a serial connection of a current source for a constant differential output in which the effect of the common mode voltage is offset.

Figure 13:
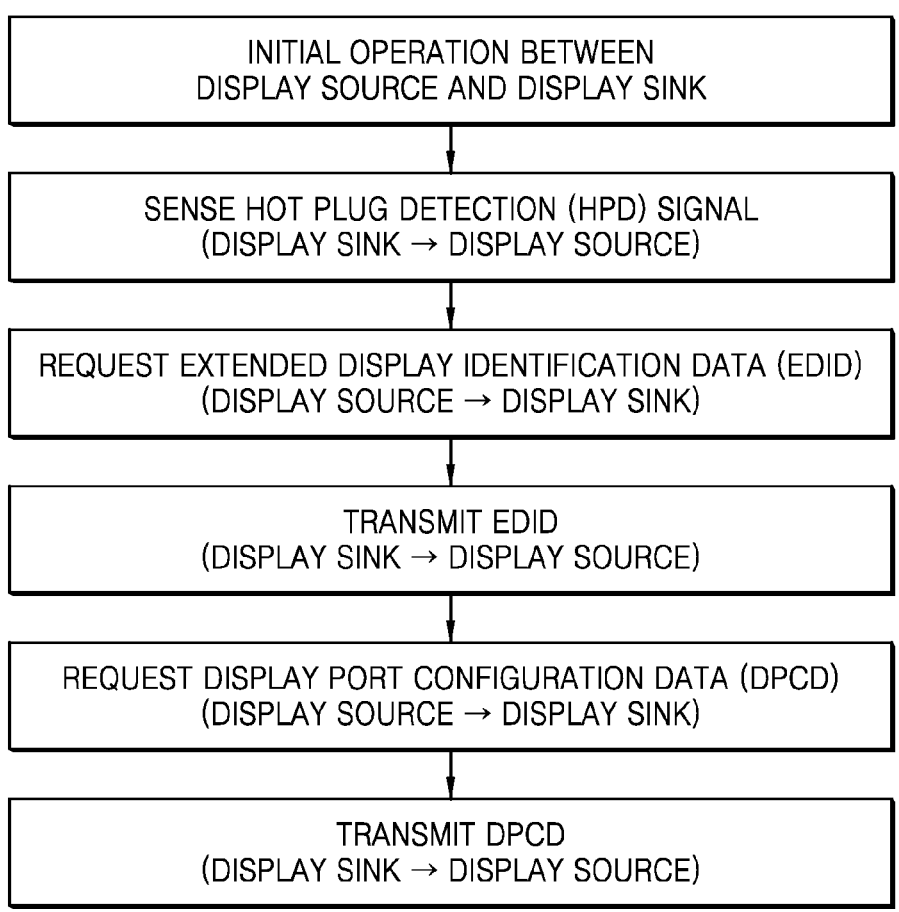
FIG. 13 is a flowchart of a process of hand shaking between a display source and a display sink.
Figure 15:
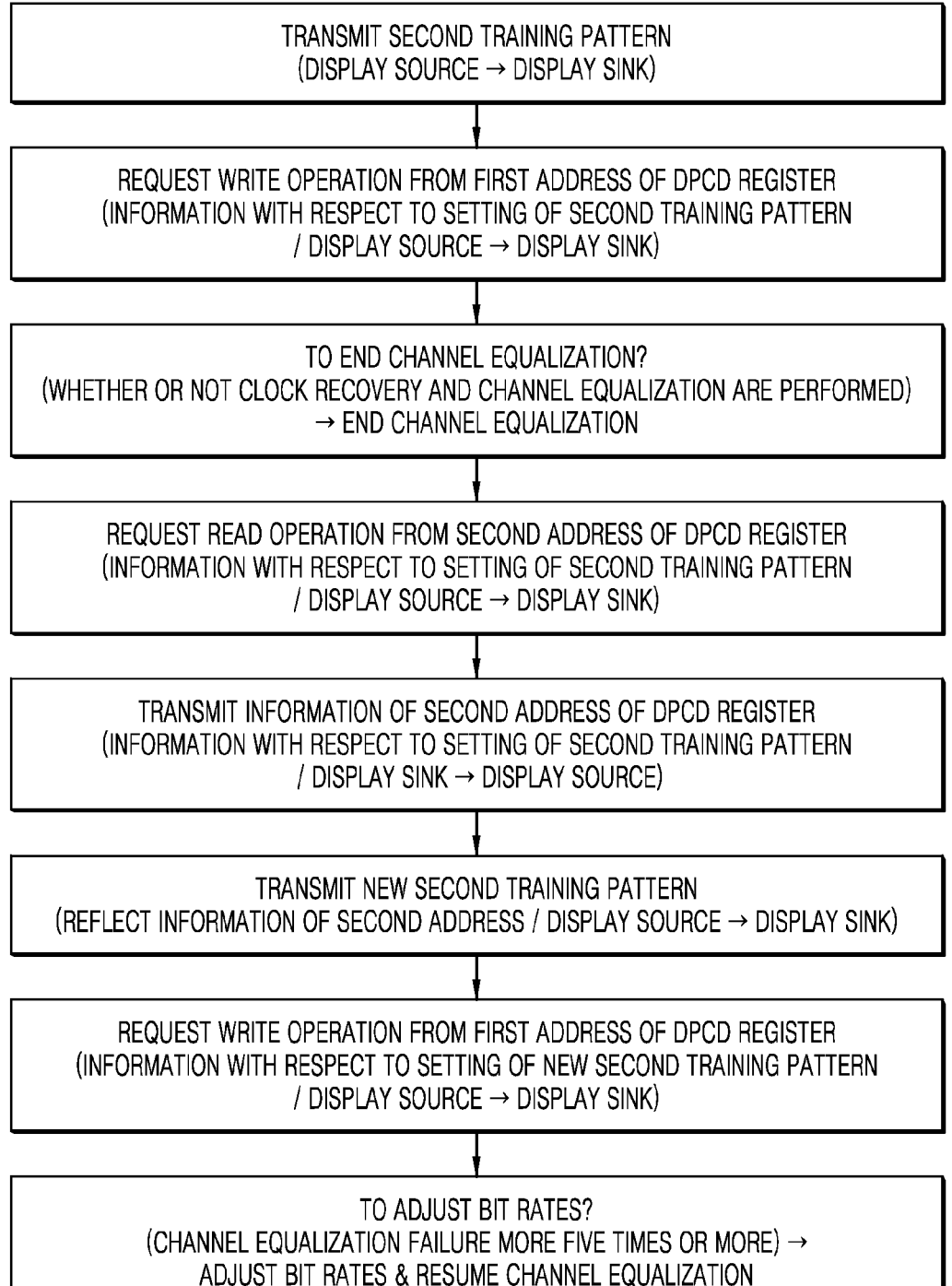

FIG. 13 is a flowchart of a process of hand shaking between a display source and a display sink. FIGS. 14 and 15 are respectively flowcharts of a process of a clock recovery sequence and a process of a channel equalization sequence, performed in link training for setting a main link.

Referring to FIG. 13, according to an embodiment, hand shaking may be performed, in which, when, in an initial operation between the display source and the display sink, the display sink notifies through an HPD signal that the display sink senses connection of the display source and the display sink is prepared to respond to a request for rendering-related data such as EDID, the display source may request the EDID information, and in response thereto, the display sink may transmit the rendering-related EDID information such as a resolution, a scan rate, etc. to the display source. Also, hand shaking may be performed, in which the display source may request a DPCD register value, and in response thereto, the display sink may transmit the DPCD register value related to setting of the main link Lane. Also, through the auxiliary channel AUX channel, the requesting for the EDID and the DPCD and the transmission of the EDID and the DPCD may be performed. After the hand shaking, as illustrated in FIGS. 14 and 15, the link training for setting the main link Lane may be performed between the display source and the display sink.

Throughout the specification, the setting of the main link Lane may include setting of pre-emphasis (or de-emphasis) with respect to a differential peak-to-peak voltage Vp-p and channel equalization. In other words, throughout the specification, information with respect to the setting of the main link Lane or information with respect to setting of a training pattern described below may include information about the differential peak-to-peak voltage Vp-p and the pre-emphasis or the de-emphasis. For example, in default setting in which there is no specific setting through the link training with respect to the setting of the main link Lane, the differential peak-to-peak voltage from the display sink may be 400 mV and the pre-emphasis (or the de-emphasis) may be 0 dB, and in the link training, the differential peak-to-peak voltage and the pre-emphasis (or the de-emphasis) may be increased according to a request by the display sink.

For example, in the link training, the display source may sequentially perform a clock recovery sequence and a channel equalization sequence, and as illustrated in FIG. 14, in the clock recovery sequence, the display source may transmit a first training pattern reflecting the default setting of the main link Lane to the display sink and may determine whether or not a clock recovery is performed by the display sink. In this case, with respect to information with respect to the setting of the first training pattern, the display source may request, through the auxiliary channel AUX channel, a "write" operation from a first address of the DPCD register, and according to whether or not the clock recovery is performed by the display sink, the display source may end the clock recovery sequence and start the channel equalization sequence. In this case, when the clock recovery fails, the display source may transmit, to the display sink, a new first training pattern in which the peak-to-peak voltage and/or the pre-emphasis (or the de-emphasis) are/is changed, in response to a request by the display sink. In this case, the display source may request, from the display sink, a "read" operation from a second address of the DPCD register, and in response to the request, the display sink may transmit information stored in the second address of the DPCD register, and the display source may transmit, to the display sink, the new first training pattern in which the peak-to-peak voltage and/or the pre-emphasis (or the de-emphasis) are/is changed by reflecting the received information of the second address of the DPCD register. In this case, with respect to information with respect to the changed setting of the first training pattern, the display source may request a "write" operation from the first address of the DPCD register. As described above, in the first address of the DPCD register of the display sink, the information with respect to the setting of the first training pattern transmitted from the display source may be stored, and in the second address of the DPCD register, the information with respect to the setting of the first training pattern requested by the display sink may be stored. Also, when the clock recovery fails even when the setting of the first training pattern is changed five times or more in response to the request by the display sink, bit rates may be reduced and the clock recovery sequence may be started again from the first.

In Table 1 and Table 2 below, examples of information stored in the first addresses 00103h, 00104h, 00105h, and 00106h and the second addresses 00206h and 00207h of the DPCD register are described. For example, according to an embodiment, the information with respect to the setting of the training pattern transmitted from the display source and the information with respect to the setting of the training pattern requested by the display sink may be stored in the first addresses and the second addresses, respectively, and specific register addresses of each of the first and second addresses and information stored in each of the specific register addresses may be as below, for example.

TABLE 1

| DPCD Address | Definition | Read/Write |
|---|---|---|
| 00103 h | TRAINING_LANE0_SET: Link Training Control_Lane0<br>Bits 1:0 = VOLTAGE SWING SET<br>00 = level 0/01 = level 1/10 = level 2/11 = level 03<br>Bit 2 = MAX_SWING_REACHED<br>Bit 4:3 = PRE-EMPHASIS_SET<br>00 = level 0/01 = level 1/10 = level 2/11 = level 03<br>Bit 5 = MAX_PRE-EMPHASIS_REACHED<br>Bits 7:6 = RESERVED. Read all 0s. | Write/Read |
| 00104 h | TRAINING_LANE1_SET<br>(Bit definition identical to that of TRAINING_LANE0_SET.) | Write/Read |
| 00105 h | TRAINING_LANE2_SET<br>(Bit definition identical to that of TRAINING_LANE0_SET.) | Write/Read |

TABLE 1-continued

| DPCD Address | Definition | Read/Write |
|---|---|---|
| 00106 h | TRAINING_LANE3_SET (Bit definition identical to that of TRAINING_LANE0_SET.) | Write/Read |

TABLE 2

| DPCD Address | Definition | Read/Write |
|---|---|---|
| 00206 h | ADJUST_REQUEST_LANE0_1: Voltage Swing and Equalization Setting Adjust Request for Lane0 and Lane1 Bits 1:0 = VOLTAGE_SWING_LANE0 00 = Level 0/01 = Level 1/10 = Level 2/11 = Level 3 Bits 3:2 = PRE-EMPHASIS_LANE0 00 = Level 0/01 = Level 1/10 = Level 2/11 = Level 3 Bits 5:4 = VOLTAGE_SWING_LANE1 00 = Level 0/01 = Level 1/10 = Level 2/11 = Level 3 Bits 7:6 = PRE-EMPHASIS_LANE1 00 = Level 0/01 = Level 1/10 = Level 2/11 = Level 3 | Read Only |
| 00207 h | ADJUST_REQUEST_LANE2_3 (Bit definitions as in ADJUST_REQUEST_LANE0_1) | Read Only |

Referring to FIG. 14, in the channel equalization sequence, the display source may transmit, through the main link Lane, a second training pattern having a more complex pattern, rather than the default setting of the main link Lane, and may determine whether or not the clock recovery and the channel equalization are performed. Here, with respect to information with respect to the setting of the second training pattern, that is, the information about the differential peak-to-peak voltage and the pre-emphasis (or the de-emphasis), the display source may request, through the auxiliary channel AUX channel, a "write" operation from the first address of the DPCD register, and according to whether or not the clock recovery and the channel equalization are performed by the display sink, the display source may end the link training including the channel equalization sequence and may transmit the main data through the setting of the main link Lane optimized through the link training. Here, when the clock recovery fails, the display source may resume the clock recovery sequence, and when, even when the clock recovery succeeds, the channel equalization fails, the display source may transmit, to the display sink, a new second training pattern in which the peak-to-peak voltage and/or the pre-emphasis (or the de-emphasis) are/is changed, in response to a request by the display sink. In this case, the display source may request a "read" operation from the second address of the DPCD register of the display sink, and in response to this request, the display sink may transmit information stored in the second address of the DPCD register, and the display source may transmit, to the display sink, the new second training pattern in which the peak-to-peak voltage and/or the pre-emphasis (or the de-emphasis) are/is changed by reflecting the received information of the second address of the DPCD register. Here, the display source may request a "write" operation from the first address of the DPCD register, with respect to the information about the peak-to-peak voltage and/or the pre-emphasis (or the de-emphasis) of the changed second training pattern. As described above, in the first address of the DPCD register of the display sink, the information with respect to the setting of the second training pattern transmitted from the display source may be stored, and in the second address of the DPCD register, the information with respect to the setting of the second training pattern requested by the display sink may be stored. Also, when the channel equalization fails even when the setting of the second training pattern is changed five times or more in response to the request by the display sink, bit rates may be reduced and the clock recovery sequence or the channel equalization sequence may be started again.

As described above, in the link training, when the clock recovery or the channel equalization fails, the information with respect to the setting of the training pattern, that is, the peak-to-peak voltage and/or the pre-emphasis (or the de-emphasis), may be adjusted, according to the request by the display sink. Here, with respect to the adjusting of the training pattern, first, the display source may request the "read" operation from the second address of the DPCD register, and in response to this request, the display sink may transmit the information with respect to the setting of the training pattern requested by the display sink, from the second address of the DPCD register, and then, the display source may transmit, to the display sink, the new first and second training patterns in which the peak-to-peak voltage and/or the pre-emphasis (or the de-emphasis) are/is changed by reflecting the received information of the second address of the DPCD register. Here, the display source may request the "write" operation from the first address of the DPCD register, with respect to the information about the peak-to-peak voltage and/or the pre-emphasis (or the de-emphasis) of the changed first and second training patterns.

According to an embodiment, the optical link mediating optical communication between the display source and the display sink may be directly involved in the link training to change the information with respect to the setting of the training pattern requested by the display sink and may change the setting to the setting optimized for the optical link so as to prevent the distortion of a transmission signal due to the optical link and achieve error-free data transfer.

Figure 16:
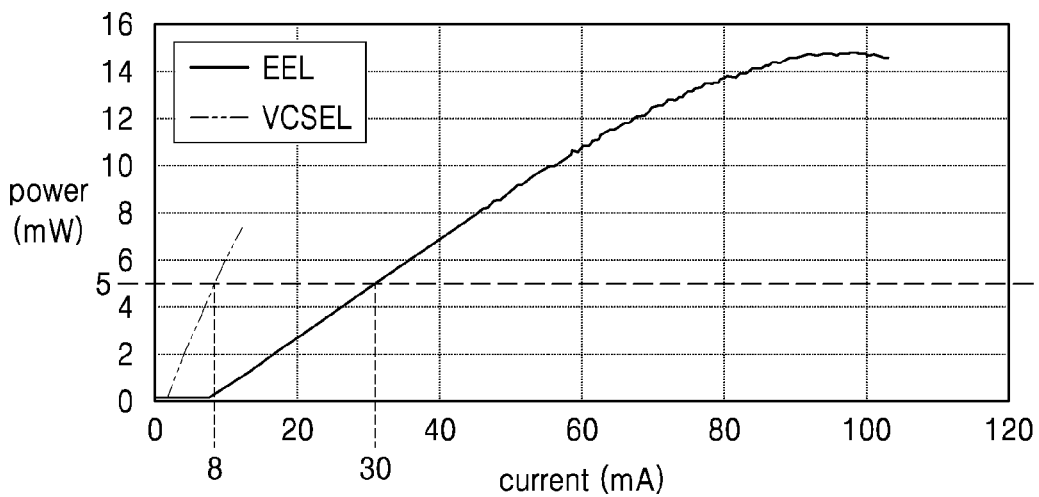
FIG. 16 is a diagram of a change in optical power according to an injection current of a light-emitting device in a vertical-cavity surface-emitting laser (VCSEL) and an edge-emitting laser (EEL), each of which is a light-emitting device applicable to a modulator.
Figure 17:
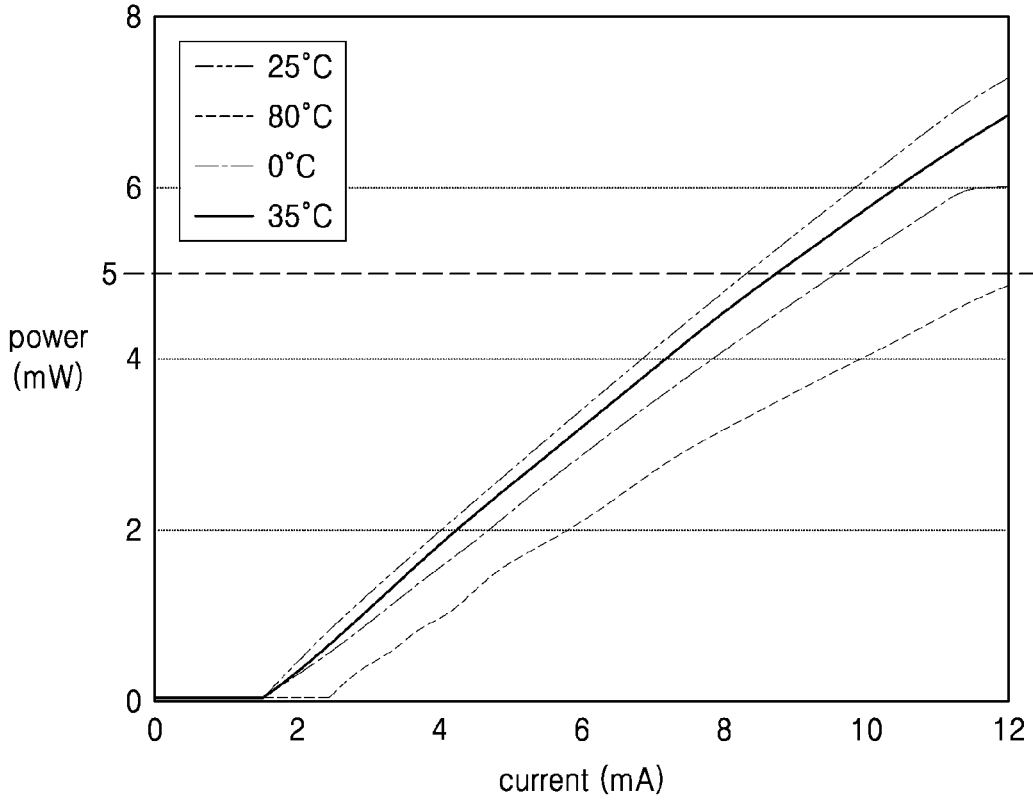
FIGS. 17 and 18 are diagrams of a change in optical power according to an injection current in a VCSEL and an EEL for different temperatures, the VCSEL and EEL each being a light-emitting device applicable to a modulator.
Figure 18:
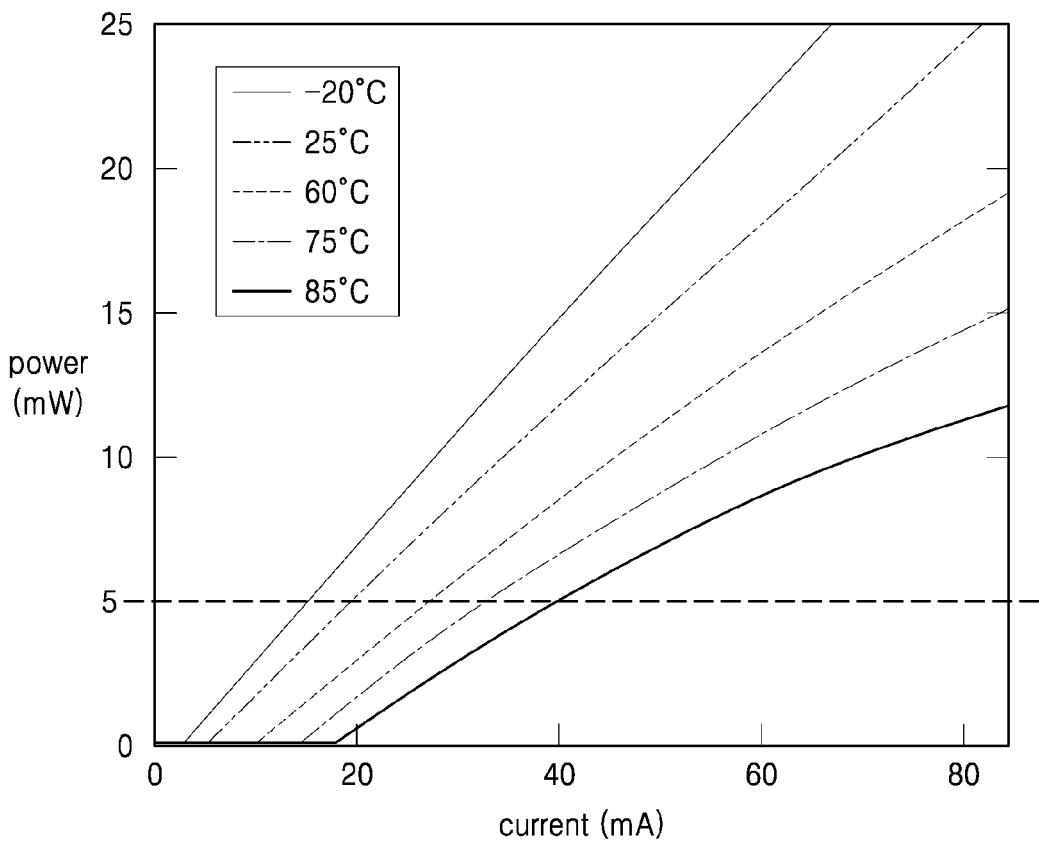

FIG. 16 is a diagram of a change in optical power according to an injection current of a light-emitting device in a vertical-cavity surface-emitting laser (VCSEL) and an edge-emitting laser (EEL), each of which is a light-emitting device applicable to a modulator. FIGS. 17 and 18 are diagrams of a change in optical power according to an injection current in a VCSEL and an EEL for different temperatures, the VCSEL and EEL each being a light-emitting device applicable to a modulator.

According to an embodiment, the optical link may perform modulation and demodulation between an electrical signal and an optical signal through the first and second photoelectric transformers (the modulator and the demodulator) connected to the display source and the display sink, respectively. For example, according to an embodiment, the light-emitting device performing modulation may have movement in which optical power with respect to the injection current generally linearly changes, but according to a temperature change, the linear movement of the light-emitting device may be differently changed. Also, as a magnitude of the injection current increases, the light-emitting device may show nonlinear movement in a converging form deviating from the linearity. Thus, generally, the light-emitting device may have the non-linear movement, deviating from the linearity having a constant inclination, according to a change of the temperature and a change of the injection current. For example, according to an embodiment, in an input and output relationship with an injection current as an input and optical power as an output, the light-emitting device performing modulation may have non-linear movement according to the change of the injection current and the change of the temperature, rather than linear movement. Also, similarly, a light-receiving device performing demodulation may have the non-linear input and output relationship, rather than the linear input and output relationship.

In the modulation and the demodulation between the electrical signal and the optical signal as described above, due to the non-linearity between the input and the output according to the movement of the photoelectric device, a transmission signal may be distorted, and with respect to equalization that intentionally causes signal distortion in advance by considering the signal distortion or loss of a high-speed link, a data transfer error may occur in the optical link applying the modulation and the demodulation, due to signal distortion, a signal delay, or ISI, caused by going through the modulation and the demodulation which may be non-linear between the input and the output. For example, in the equalization, pre-emphasis or de-emphasis may be formed at the front end or the back end of a symbol of a transmission signal, and although the signal pre-distorted by the equalization may be valid in transmission lines L1 and L2 not any further going through transformation, the signal may cause a data transfer error in an optical link additionally applying modulation and demodulation for additional photoelectric transformation. Therefore, according to an embodiment, the FPGA circuit of the optical link may engage in exchanging information with respect to setting of a training pattern and may change the information with respect to the setting of the training pattern requested by the display sink and change the setting to the setting optimized for the optical link.

According to an embodiment, in the link training, when the clock recovery or the channel equalization fails, the information with respect to the setting of the training pattern, that is, the peak-to-peak voltage and/or the pre-emphasis (or de-emphasis), may be adjusted in response to a request by the display sink. Here, first, the display source may request the second address of the DPCD register to transmit the information with respect to the setting of the training pattern requested by the display sink. In more detail, the display source may request a "read" operation from the second address of the DPCD register. Also, in response to the request for the "read" operation, the request being received from the display source, the display sink may transmit, from the second address, the information with respect to the setting of the training pattern requested by the display sink.

According to an embodiment, with respect to the setting of the main link Lane, the setting with respect to the differential peak-to-peak voltage Vp-p and the channel equalization may be set as the swing levels and the pre-emphasis levels of Table 3 as below.

TABLE 3

| | Output Signal Pre-emphasis Level 0: 0 dB | Output Signal Pre-emphasis Level 1: 3.5 dB | Output Signal Pre-emphasis Level 2: 6.0 dB | Output Signal Pre-emphasis Level 3: 9.5 dB |
|---|---|---|---|---|
| Output Signal swing level0: Vpp 400 mV | Required | Required | Required | Optional |

TABLE 3-continued

| | Output Signal Pre-emphasis Level 0: 0 dB | Output Signal Pre-emphasis Level 1: 3.5 dB | Output Signal Pre-emphasis Level 2: 6.0 dB | Output Signal Pre-emphasis Level 3: 9.5 dB |
|---|---|---|---|---|
| Output Signal swing level1: Vpp 600 mV | Required | Required | Required | Not Allowed |
| Output Signal swing level2: Vpp 800 mV | Required | Required | Not Allowed | Not Allowed |
| Output Signal swing level3: Vpp 1200 mV | Optional | Not Allowed | Not Allowed | Not Allowed |

Figure 19:
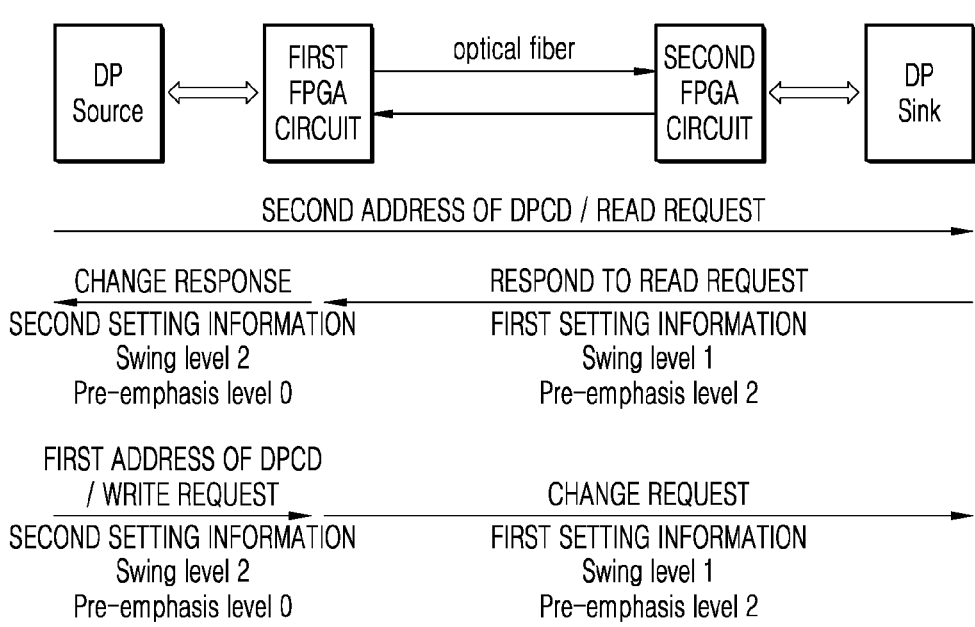
Figure 20:
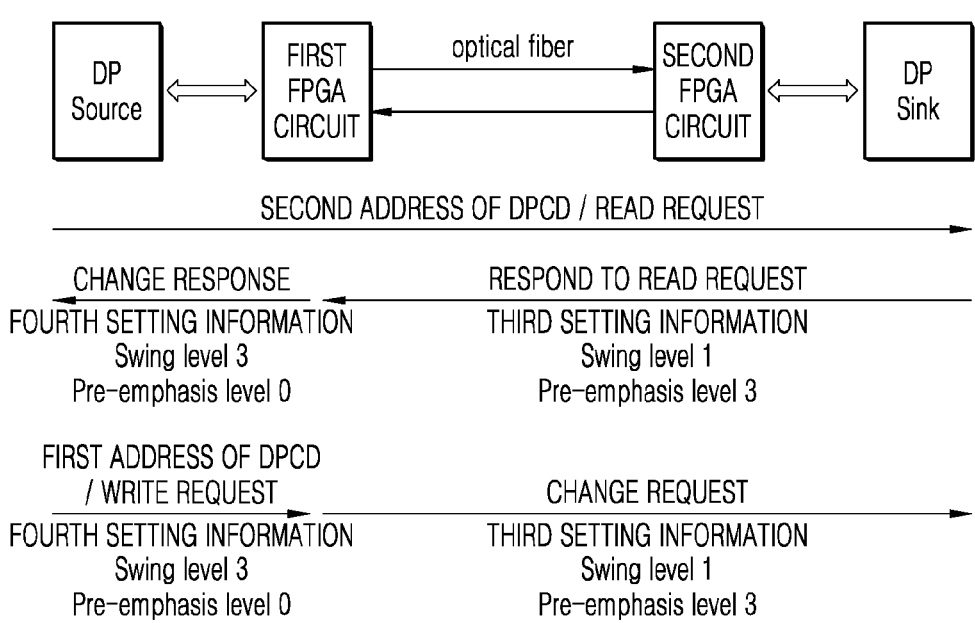

FIGS. 19 and 20 are diagrams of a process of intervention between a display source and a display sink to change DPCD with respect to setting of a main link to optimized setting for an optical link, wherein FIGS. 19 and 20 are respectively diagrams of a process of changing setting of a training pattern in the case of an $n^{th}$ failure of channel equalization and a process of changing setting of a training pattern in the case of an $n+1^{th}$ failure of channel equalization.

Referring to FIG. 19, the display sink may request Swing level 1 for the peak-to-peak voltage and request Pre-emphasis level 2 (corresponding to first setting information of the claims) for the pre-emphasis (or de-emphasis). However, the FPGA circuit of the optical link may change the request by the display sink with respect to the setting of the training pattern to the different setting optimized for the optical link. For example, the FPGA circuit of the optical link may change the peak-to-peak voltage to Swing level 2, and the pre-emphasis (or de-emphasis) to Pre-emphasis level 0 (corresponding to second setting information of the claims). That is, in response to the request for the "read" operation of the display source, the FPGA circuit of the optical link may not intactly transmit the change with respect to the setting of the training pattern (information of the second address) of the display sink. Rather, for example, the FPGA circuit may change Swing level 1 and Pre-emphasis level 2 (the first setting information), which are the second address information, to Swing level 2 and Pre-emphasis level 0 (the second setting information), which are the optimized setting for the optical link, and may transmit, to the display source, Swing level 2 and Pre-emphasis level 0 (the second setting information), the optimized setting for the optical link, as the second address information. Thus, the display source may recognize the request by the display sink as Swing level 2 and Pre-emphasis level 0 (the second setting information), which are optimized for the optical link, differently from an initial request by the display sink, and may change and transmit the training pattern as the optimized setting for the optical link. Also, with respect to the optimized setting for the optical link (the second setting information, Swing level 2 and Pre-emphasis level 0), which is different from the initial request (the first setting information), the display source may request the "write" operation from the first address of the DPCD register. Here, the FPGA circuit of the optical link may intervene again and may intactly transmit, to the display sink, the initial request (the first setting information, Swing level 1 and Pre-emphasis level 2) of the display sink, which is different from the request for the "write" operation (the second setting information) by the display source. As described above, the FPGA circuit of the optical link may intervene in the response to the request for the "read" operation from the second address, the request being made by the display source, and may change the second address information (the first setting information) to the optimized setting for the optical link (the second setting information) and transmit the changed second address information to the display source. Also, the FPGA circuit of the optical link may intervene in the request for the "write" operation from the first address, the request being made by display sink, and may change the second setting information, requested to be written by the display source, to the first setting information initially requested by the display sink and transmit the changed setting information to the display sink so that the display sink may recognize the setting of the training pattern (the first setting information) changed by reflecting the request by the display sink, that is, the information of the second address (the first setting information) in which the setting of the training pattern requested by the display sink is stored may correspond to the information of the first address (the first setting information) in which the setting of the training pattern transmitted from the display source is stored. Thus, the display sink may not sense any abnormality, and also, the display source may not sense any abnormality, because the display source transmits the training pattern by changing the training pattern to the setting requested by the display sink.

According to an embodiment, the communication with respect to the setting of the training pattern between the display source and the display sink may be performed when the clock recovery or the channel equalization fails in the link training, and thus, through active intervention of the optical link, setting of the main link Lane may have to be optimized, and unnecessary delay or failure of the link training may have to be prevented. For example, according to an embodiment, when the clock recovery or the channel equalization fails five times or more despite re-setting of the training pattern, the bit rates may be reduced, and thus, in order that the transmission speed of the main link Lane is not reduced, the active intervention of the optical link may be required.

For example, when the clock recovery or the channel equalization fails in the link training, to raise the level of pre-emphasis may cause a data transfer error in the optical link applying the modulation and the demodulation for photoelectric transformation, despite the request by the display sink to raise the level of pre-emphasis. Thus, in the optimized setting for the optical link, the pre-emphasis may be adjusted to Pre-emphasis level 0 in which there is no pre-emphasis, and when, unlike the initial request, the level of pre-emphasis is adjusted to Pre-emphasis level 0, the peak-to-peak voltage may be adjusted to a swing level which is one-step higher than the level requested by the display sink. To raise the peak-to-peak voltage one-step higher may be a configuration to take into account distortion or a delay of a signal, ISI, or the like which may be caused in a high-speed optical link. For example, as described above, Swing level 1 and Pre-emphasis level 2 (the first setting information) requested by the display sink may be adjusted to Swing level 2 and Pre-emphasis level 0 (the second setting information) through the FPGA circuit of the optical link.

In the link training, when the clock recovery or the channel equalization fails, the maximum five times of adjusting may be permitted. Thus, re-setting of the training pattern may be performed to change previous setting whenever the clock recovery or the channel equalization fails. For example, there is a likelihood for the display sink to request levels of the peak-to-peak voltage and the pre-emphasis that are one-step higher than the previous setting, for the clock recovery and the channel equalization.

As illustrated in FIG. 19, when the $n^{th}$ channel equalization fails, for the re-setting of the training pattern, the pre-emphasis level may be adjusted to Pre-emphasis level 0 unlike an initial request (Pre-emphasis level 2), and when the pre-emphasis level is adjusted, the peak-to-peak voltage may be adjusted to Swing level 2, which is one-step higher than Swing level 1, requested by the display sink (when the nth failure occurs, the first setting information may be changed to the second setting information).

Referring to FIG. 20, when, despite the adjustment as illustrated in FIG. 19, the clock recovery or the channel equalization fails, that is, the $n+1^{th}$ failure occurs, and for the re-setting of the training pattern, the pre-emphasis level (Pre-emphasis level 3: third setting information) is requested to be higher than a previous request (Pre-emphasis level 2: the first setting information) and the peak-to-peak voltage (Swing level 1: the third setting information) is requested to be the same level as the previous request (Swing level 1: the first setting information), the pre-emphasis level may be adjusted to Pre-emphasis level 0 in this case also. Also, while, because the pre-emphasis level is adjusted, the peak-to-peak voltage may be adjusted to Swing level 2 which is one-step higher than the level (Swing level 1) requested by the display sink, the peak-to-peak voltage, in this case, may be adjusted to be the same as the previous setting, which is Swing level 2 and Pre-emphasis level 0 (the second setting information). Thus, by taking into account the fact that the clock recovery or the channel equalization fails despite the previous adjustment, the peak-to-peak voltage may be adjusted to Swing level 3 and Pre-emphasis level 0 (fourth setting information), Swing level 3 being two-step higher than the previous setting, and the adjusting of the peak-to-peak voltage as described above may be performed until the peak-to-peak voltage reaches the maximum voltage. For example, for the re-setting of the training pattern in the case of a subsequent $n+2^{th}$ failure, even when the pre-emphasis level is adjusted to be different from a request by the display sink, the peak-to-peak voltage may reach the maximum voltage (the maximum voltage (Swing level 3) permitted at Pre-emphasis level 0), from which the peak-to-peak voltage may not be any further increased, and thus, the peak-to-peak voltage may maintain the previous setting, Swing level 3 and Pre-emphasis level 0 (the fourth setting information). For example, according to the disclosure, the display sink may determine that the setting requested by the display sink, which is different from the setting adjusted by the optical link, is reflected and may request a further increase of the peak-to-peak voltage, even when the current setting (Swing level 3) is the maximum voltage. However, the maximum voltage (Swing level 3) is already reached through the adjusting of the optical link, and thus, further adjusting may not be permitted.

According to the disclosure, the optical link may adjust the pre-emphasis level to Pre-emphasis level 0, and thus, without being limited by different maximum voltages according to the pre-emphasis level, the maximum voltage may be increased to, for example, Swing level 3. In this sense, the optimized setting for the optical link according to the disclosure may be understood to be variable according to the request by the display sink, rather than to be fixed to constant levels of the peak-to-peak voltage and the pre-emphasis. However, the setting of the pre-emphasis optimized for the optical link may be understood to be determined as Pre-emphasis level 0, and the peak-to-peak voltage optimized for the optical link may be understood as being able to rise to the maximum voltage according to the request by the display sink.

For example, according to an embodiment, the peak-to-peak voltage may be differentially limited to different levels according to the pre-emphasis level (see Table 3). For example, as the pre-emphasis level rises, the peak-to-peak voltage may be gradually limited to a decreasing voltage level, and at the lowest pre-emphasis level, which is Pre-emphasis level 0, the maximum voltage that is permitted may be up to Swing level 3. According to an embodiment, the FPGA circuit of the optical link may adjust the setting of the pre-emphasis to Pre-emphasis level 0, which is the optimized setting for the optical link and is different from the request by the display sink, and thus, the peak-to-peak voltage may be raised to the maximum voltage of Swing level 3.

Figure 21:
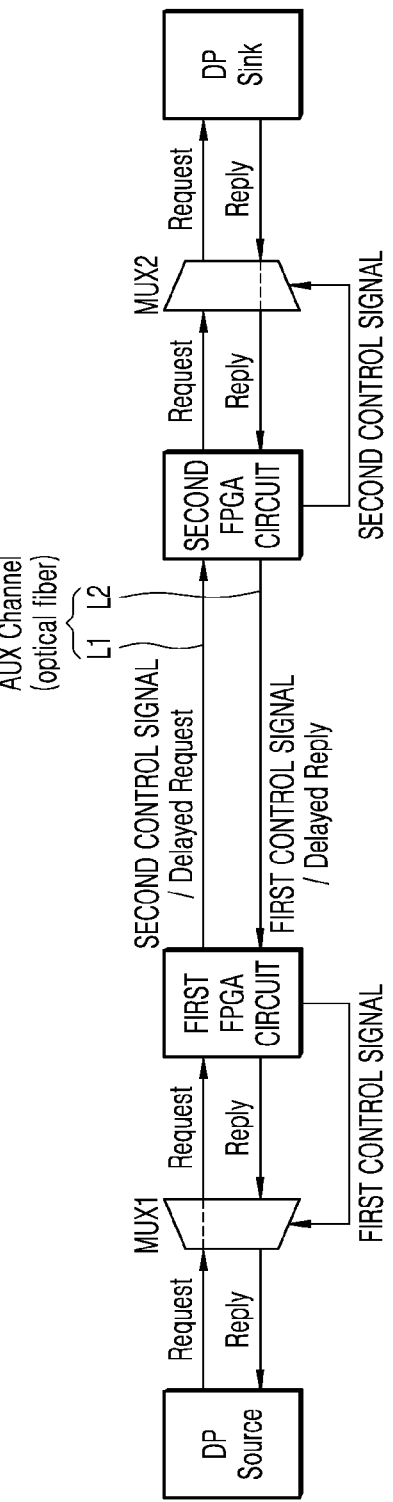
FIG. 21 is a diagram of a structure of an auxiliary channel for supporting full-duplex, according to an embodiment.

FIG. 21 is a diagram of a structure of an auxiliary channel for supporting full-duplex, according to an embodiment.

According to an embodiment, the FPGA circuit may read the auxiliary data transmitted through the auxiliary channel AUX channel via the front-end signal processor (see FIGS. 11 and 12) connected to the front end of the FPGA circuit, and for example, may convert the auxiliary data of a differential signal to a single-ended signal (the differential receiver), may recover a clock signal through the CDR, and may convert (the sampler) the auxiliary data into binarized data by using the recovered clock signal so as to read the content of the auxiliary data. Also, the FPGA circuit may analyze the auxiliary data transmitted through the auxiliary channel AUX channel to recognize the auxiliary data as two types, which are a request from the display source and a response from the display sink, thereby fully duplexing, rather than half-duplexing, the auxiliary channel AUX channel. For example, an optical fiber forming the auxiliary channel AUX channel may include a single transmission line L1 or L2 (a single optical fiber) in the half-duplexing. However, for the full-duplexing, the optical fiber may include two transmission lines L1 and L2 assigned in opposite transmission directions. The two transmission lines L1 and L2 may include a first transmission line L1 configured to transmit the auxiliary data (the request by the display source) from the display source to the display sink and a second transmission line L2 configured to transmit the auxiliary data (the response by the display sink) from the display sink to the display source.

The display source, in more detail, an AUX terminal of the display source, may be connected to the first and second transmission lines L1 and L2 through a first multiplexer MUX1, and according to the presence of a first control signal transmitted to the first multiplexer MUX1, may be selectively connected to any one transmission line L1 or L2 of the first and second transmission lines L1 and L2. For example, when the first control signal is not transmitted to the first multiplexer MUX1, the first multiplexer MUX1 may be connected to the first transmission line L1 and may transmit an output from the display source, that is, the request by the display source, through the first transmission line L1, and when the first control signal is transmitted to the first multiplexer MUX1, the first multiplexer MUX1 may be disconnected from the first transmission line L1 and may be connected to the second transmission line L2 and may receive the response from the display sink through the second transmission line L2.

The display sink, in more detail, an AUX terminal of the display sink, may be connected to the first and second transmission lines L1 and L2 through a second multiplexer MUX2, and according to the presence of a second control signal transmitted to the second multiplexer MUX2, may be selectively connected to any one transmission line L1 or L2 of the first and second transmission lines L1 and L2. For example, when the second control signal is not transmitted to the second multiplexer MUX2, the second multiplexer MUX2 may be connected to the second transmission line L2 and may transmit an output from the display sink, that is, the response from the display sink, through the second transmission line L2, and when the second control signal is transmitted to the second multiplexer MUX2, the second multiplexer MUX2 may be disconnected from the second transmission line L2 and may be connected to the first transmission line L1 and may receive the request from the display source through the first transmission line L1.

As described above, the display source and the display sink may be connected to the first and second transmission lines L1 and L2, respectively, to transmit the request from the display source and the response from the display sink, respectively, when additional control signals are not transmitted to the first and second multiplexers MUX1 and MUX2, and when the connection states of the first and second multiplexers MUX1 and MUX2 are switched according to the first and second control signals generated according to the data analysis of the FPGA circuit, the display source and the display sink may receive the response and the request from each other. According to an embodiment, the first and second control signals may be transmitted prior to the auxiliary data. For example, the auxiliary data may be delayed, and the first and second control signals may be transmitted first. By delaying the auxiliary data and transmitting the first and second control signals before the auxiliary data by storing the auxiliary data in the register of the FPGA circuit and adjusting a clock timing, the connection states of the first and second multiplexers MUX1 and MUX2 may be switched by transmitting the first and second control signals to the first and second multiplexers MUX1 and MUX2, so that the corresponding auxiliary data may be received.

In more detail, with respect to the request from the display source, the first FPGA circuit adjacent to the display source may analyze the auxiliary data to identify the request from the display source and may delay the corresponding auxiliary data and transmit the second control signal prior to the auxiliary data so that the second FPGA circuit of the display sink receiving the second control signal may transmit the second control signal to the second multiplexer MUX2. The second multiplexer MUX2 receiving the second control signal may switch a connection state to be disconnected from the second transmission line L2 and to be connected with the first transmission line L1, and thus, the auxiliary data (the request from the display source) received through the first transmission line L1 may be transmitted to the display sink.

On the contrary, with respect to the response from the display sink, the second FPGA circuit adjacent to the display sink may analyze the auxiliary data to identify the response from the display sink and may delay the corresponding auxiliary data and transmit the first control signal prior to the auxiliary data so that the first FPGA circuit of the display source receiving the first control signal may transmit the first control signal to the first multiplexer MUX1. The first multiplexer MUX1 receiving the first control signal may switch a connection state to be disconnected from the first transmission line L1 and to be connected with the second transmission line L2, and thus, the auxiliary data (the response from the display sink) received through the second transmission line L2 may be transmitted to the display source.

According to an embodiment, the first and second FPGA circuits may be connected at the inner ends along the first and second transmission lines L1 and L2 through which the auxiliary data is transmitted, and the first and second multiplexers MUX1 and MUX2 may be connected at the outer ends with respect to the first and second FPGA circuits. The first and second FPGA circuits may be connected at the inner ends along the first and second transmission lines L1 and L2, and thus, the first and second control signals for analyzing the first and second control signals transmitted through the first and second transmission lines L1 and L2 and switching the connection states may be transmitted to the first and second multiplexers MUX1 and MUX at the back ends.

For example, the first FPGA circuit may be connected at the inner end with respect to the first multiplexer MUX1, and thus, regardless of the connection state of the first multiplexer MUX1, may always be connected to the first and second transmission lines L1 and L2 and may identify all of the auxiliary data transmitted through the first and second transmission lines L1 and L2. In other words, the first FPGA circuit may transmit the second control signal to analyze the request from the display source transmitted through the first and second transmission lines L1 and L2 and to convert the connection state of the second multiplexer MUX2 and may also transmit the first control signal to switch the connection state of the first multiplexer MUX1 according to the first control signal transmitted through the second transmission line L2.

For example, the first multiplexer MUX1 may be arranged between the display source and the first FPGA circuit and may maintain a connected state with the first transmission line L1 so that the request from the display source may be transmitted to the first FPGA circuit when the first control signal is not transmitted so as not to block the request from the display source.

According to an embodiment, when the first control signal is received through the second transmission line L2 while the request from the display source is being transmitted through the first transmission line L1, the first FPGA circuit may ignore the first control signal and may not transmit the first control signal to the first multiplexer MUX1. That is, by prioritizing the request from the display source, the first FPGA circuit may first transmit the request from the display source to the display sink. For example, when the display source does not receive the response from the display sink, for example, when the display source does not receive an ACK signal, the display source may request again the response from the display sink (for example, may re-transmit the request to the display sink). However, according to an embodiment, the request from the display source and the response from the display sink in response to this request may be sequentially performed. Accordingly, there may not be many cases as described above where the request from the display source and the response from the display sink simultaneously occur. For example, in the link training described above, the request from the display source, that is, the request for the "read" and the "write" operations with respect to the DPCD register, and the response from the display sink in response to the request may be sequentially performed.

Similarly to the first FPGA circuit, the second FPGA circuit may be connected at the inner end with respect to the second multiplexer MUX2, and thus, regardless of the connection state of the second multiplexer MUX2, may always be connected to the first and second transmission lines L1 and L2 and may identify all of the auxiliary data transmitted through the first and second transmission lines L1 and L2. In other words, the second FPGA circuit may transmit the first control signal to analyze the response from the display sink transmitted through the first and second transmission lines L1 and L2 and to switch the connection state of the first multiplexer MUX1 and may also transmit the second control signal to convert the connection state of the second multiplexer MUX2 according to the second control signal transmitted through the first transmission line L1.

For example, the second multiplexer MUX2 may be arranged between the display sink and the second FPGA circuit and may maintain a connected state with the second transmission line L2 so that the response from the display sink may be transmitted to the second FPGA circuit when the second control signal is not transmitted so as not to block the response from the display sink. When the second control signal is received through the first transmission line L1 while the response from the display sink is being transmitted through the second transmission line L2, the second FPGA circuit may transmit the second control signal to the second multiplexer MUX2 and may block the response from the display sink. That is, by prioritizing the request from the display source, the second FPGA circuit may block the response from the display sink (may be disconnected from the second transmission line L2) so that the request from the display source is prioritized to the response from the display sink and may switch the connection state of the second multiplexer MUX2 (may transmit the second control signal) to receive the request from the display source. For example, when the display source does not receive the response from the display sink, for example, when the display source does not receive an ACK signal, the display source may request again the response from the display sink (for example, may re-transmit the request to the display sink). However, as described above, the request from the display source and the response from the display sink in response to this request may be sequentially performed. Accordingly, there may not be many cases as described above where the request from the display source and the response from the display sink simultaneously occur.

Figure 22:
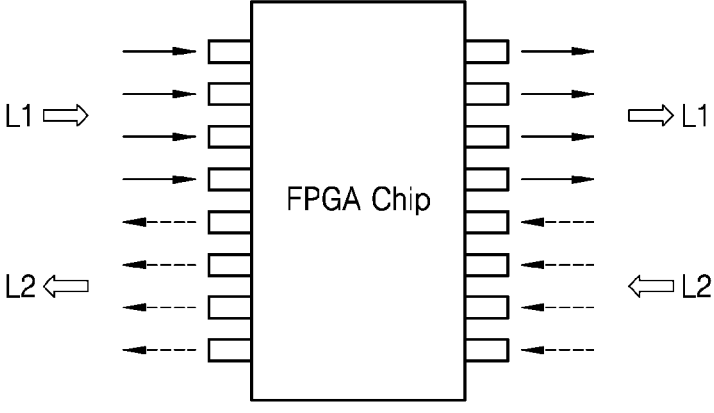
FIG. 22 is a schematic diagram of a processing operation of a signal transmitted from an operation processor or a field-programmable gate array (FPGA) chip in a first FPGA circuit and a second FPGA circuit through a first transmission line and a second transmission line, according to an embodiment.

FIG. 22 is a schematic diagram of a processing operation of a signal transmitted from an operation processor or an FPGA chip in a first FPGA circuit and a second FPGA circuit through a first transmission line and a second transmission line, according to an embodiment.

According to various embodiments, the first and second FPGA circuits may be connected to both of the first and second transmission lines L1 and L2. For example, the first FPGA circuit may include each of the front-end signal processor and the back-end signal processor connected to the first and second transmission lines L1 and L2. For example, the operation processor or the FPGA chip of the first FPGA circuit may process, in parallel, the auxiliary data of the first transmission line L1 and the auxiliary data of the second transmission line L2 through an input pin and an output pin with respect to the first transmission line L1 and an input pin and an output pin with respect to the second transmission line L2. Similarly, the second FPGA circuit may include each of the front-end signal processor and the back-end signal processor connected to the first and second transmission lines L1 and L2. For example, the operation processor or the FPGA chip of the second FPGA circuit may process, in parallel, the auxiliary data of the first transmis- sion line L1 and the auxiliary data of the second transmission line L2 through the input pin and the output pin with respect to the first transmission line L1 and the input pin and the output pin with respect to the second transmission line L2.

According to an embodiment, the FPGA circuit may include the operation processor or the FPGA chip processing, in parallel, the auxiliary data of the first and second transmission lines L1 and L2 and may include the front-end signal processor and the back-end signal processor connected to the front end and the back end with respect to the operation processor (or the FPGA chip). Here, the operation processor (the FPGA chip) may together take charge of digital signal processing of the front and back-end signal processors, and thus, for example, the differential receiver, the CDR, the sampler, and the differential driver configured to process an analog signal of the front and back-end signal processors may be included in the front and back-end signal processors and may be connected to the first and second transmission lines L1 and L2 of each of the front and back-end signal processors. However, the role of the shifter register (the serializer and the deserializer, serial to parallel, parallel to serial) taking charge of digital signal processing may be taken charge of by the operation processor (or the FPGA chip) processing in parallel the auxiliary data transmitted through the first and second transmission lines L1 and L2.

Hereinafter, analysis of the FPGA circuit with respect to the auxiliary data, that is, the analysis of the FPGA circuit with respect to the request from the display source and the response from the display sink is to be described.

Figure 23:
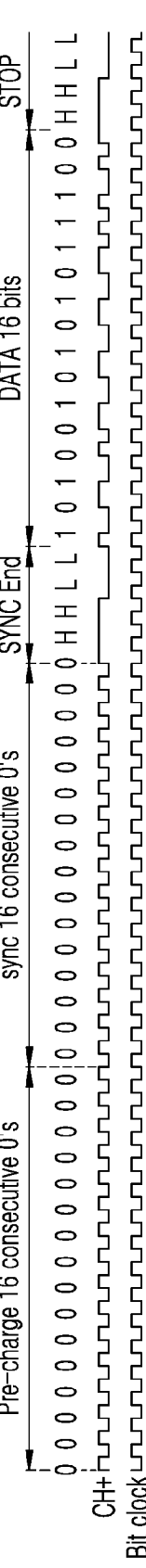
FIG. 23 is a schematic diagram of a data frame of an auxiliary signal transmitted through an auxiliary channel, according to an embodiment.

FIG. 23 is a schematic diagram of a data frame of an auxiliary signal transmitted through an auxiliary channel, according to an embodiment. According to an embodiment, the auxiliary signal including the auxiliary data may include a pre-charge pattern Pre-charge prior to data. According to an embodiment, the auxiliary signal transmitted through the auxiliary channel AUX channel may be coded as the Manchester II code. For example, in the Manchester II code, a low signal may be coded as a rising edge of a bit column, and a high signal may be coded as a falling edge of the bit column. For example, as the pre-charge pattern Pre-charge, 10 to 16 low signals (0 bits) may be output. For example, in the auxiliary data to which the Manchester II code is applied, the low signals may be coded as the rising edge of the bit column and may output the pre-charge pattern Pre-charge alternately including the rising and the falling of the bit column, and the pre-charge pattern Pre-charge output as the single-ended signal may be converted into the differential signal in the auxiliary channel AUX channel. The pre-charge pattern Pre-charge converted into the differential signal may correspond to the differential signal biased as a constant DC voltage. The decoupling capacitor C_AUX (FIG. 9) in the auxiliary channel AUX channel may be charged through the pre-charge pattern Pre-charge. For example, a difference between bias voltages Vbias Tx and Vbias Rx may be formed between the AUX+ signal line and the AUX− signal line forming the differential voltage between the transmitter Tx and the receiver Rx. In other words, the pre-charge pattern Pre-charge may charge the decoupling capacitor C_AUX (FIG. 9) in the auxiliary channel AUX channel to form different common mode voltages between the transmitter Tx and the receiver Rx.

According to an embodiment, the optical link may recover the clock signal for synchronization with the display source or the display sink corresponding to the transmitter, by using the pre-charge pattern Pre-charge, and may drive the CDR to recover the clock signal embedded in the pre-charge pattern Pre-charge, by using the pre-charge pattern Pre-charge as an input. For example, the CDR may perform a PI feedback control operation such that a frequency of the pre-charge pattern Pre-charge that is input may match a frequency that is output from the VCO, so as to recover the clock signal having the same frequency as the pre-charge pattern Pre-charge and output the auxiliary data as binarized data according to the recovered clock signal (the sampler).

The auxiliary signal may include a sync pattern SYNC for synchronization between the transmitter and the receiver, in addition to the pre-charge pattern Pre-charge, and may output, to the sync pattern SYNC, 16 low signals as the Manchester II code. Also, the auxiliary data may include a sync end pattern SYNC End notifying an end of the sync pattern SYNC, and the sync end pattern SYNC End may maintain a high signal for a predetermined time period, rather than the Manchester II code, and then, may maintain a low signal for a predetermined time period, and after the sync end pattern SYNC End, data DATA of the auxiliary signal may be followed. For example, the data, such as the "read" request and the "write" request with respect to the first and second addresses of the DPCD register, the responses in response to the requests, the responses including information with respect to the first and second addresses of the DPCD register, etc., may be included, and after that, a data end pattern the same as the sync end pattern SYNC End may follow.

According to an embodiment, to fully duplex the auxiliary channel AUX channel between the display source and the display sink, the auxiliary data transmitted therebetween may be analyzed. To this end, the FPGA circuit may recover the clock signal for synchronization by using the pre-charge pattern Pre-charge corresponding to a preamble of the auxiliary signal including the auxiliary data, and thus, may recover the clock signal (the low signal as the Manchester II code) the same as the sync pattern SYNC substantially the same as the pre-charge pattern Pre-charge and may recover the clock signal through the pre-charge pattern Pre-charge maintained to be shorter than or equal to the sync pattern SYNC. For example, before the signal distortion which may occur through the modulation and the demodulation of the optical link, that is, by recovering the clock signal through the optical link (the front-end signal processor) connected to be adjacent to the display source or the display sink corresponding to the transmitter at the front end of the optical fiber, the clock signal may be recovered through the pre-charge pattern Pre-charge maintained to be shorter than or equal to the sync pattern SYNC of the auxiliary signal, rather than through the sync pattern SYNC of the auxiliary signal, despite the distortion possibility of the pre-charge pattern Pre-charge (for example, charging of the decoupling capacitor C_AUX of the auxiliary channel).

Figure 24:
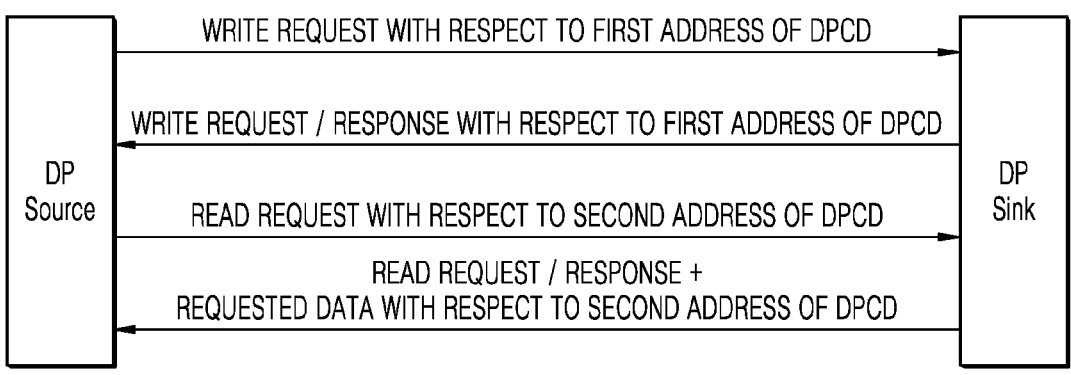
FIG. 24 is a diagram of a process in which a request and a response with respect to first address information and second address information in a DPCD register are generated in order to set a main link between a display device and a display sink in link training, according to an embodiment.

FIG. 24 is a diagram of a process in which a request and a response with respect to first address information and second address information in a DPCD register are generated in order to set a main link between a display device and a display sink in link training, according to an embodiment.

Figure 25:
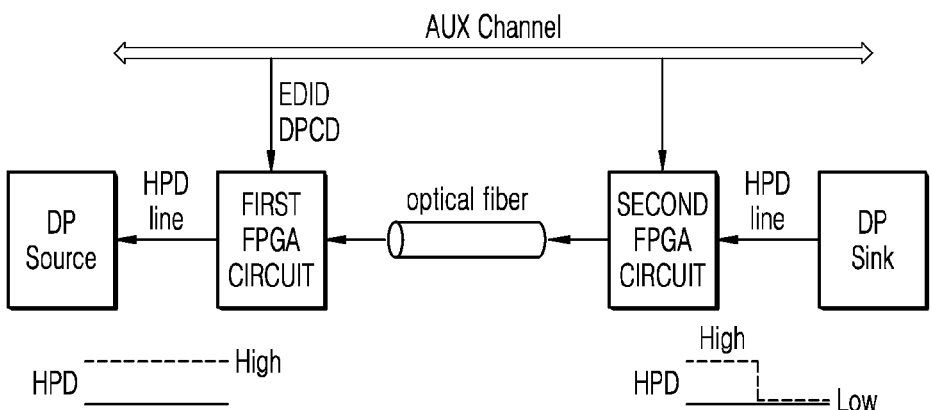
FIG. 25 is a schematic diagram of a process of an optical link storing extended display identification data (EDID) information and DPCD information transmitted between a display source and a display sink, according to an embodiment.

FIG. 25 is a schematic diagram of a process of an optical link storing EDID information and DPCD information transmitted between a display source and a display sink, according to an embodiment.

Figure 26:
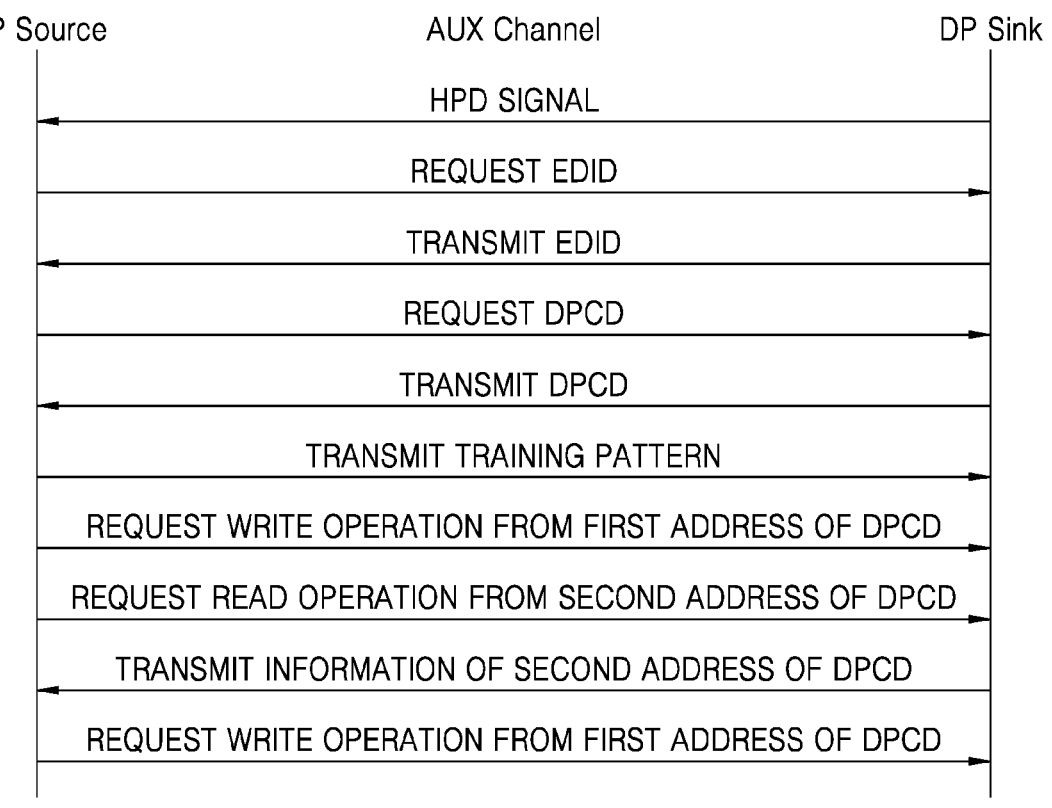
FIG. 26 is a schematic diagram showing the flow of a request and a transmission of EDID information and DPCD information between a display source and a display sink.

FIG. 26 is a schematic diagram showing the flow of a request and a transmission of EDID information and DPCD information between a display source and a display sink.

Figure 27:
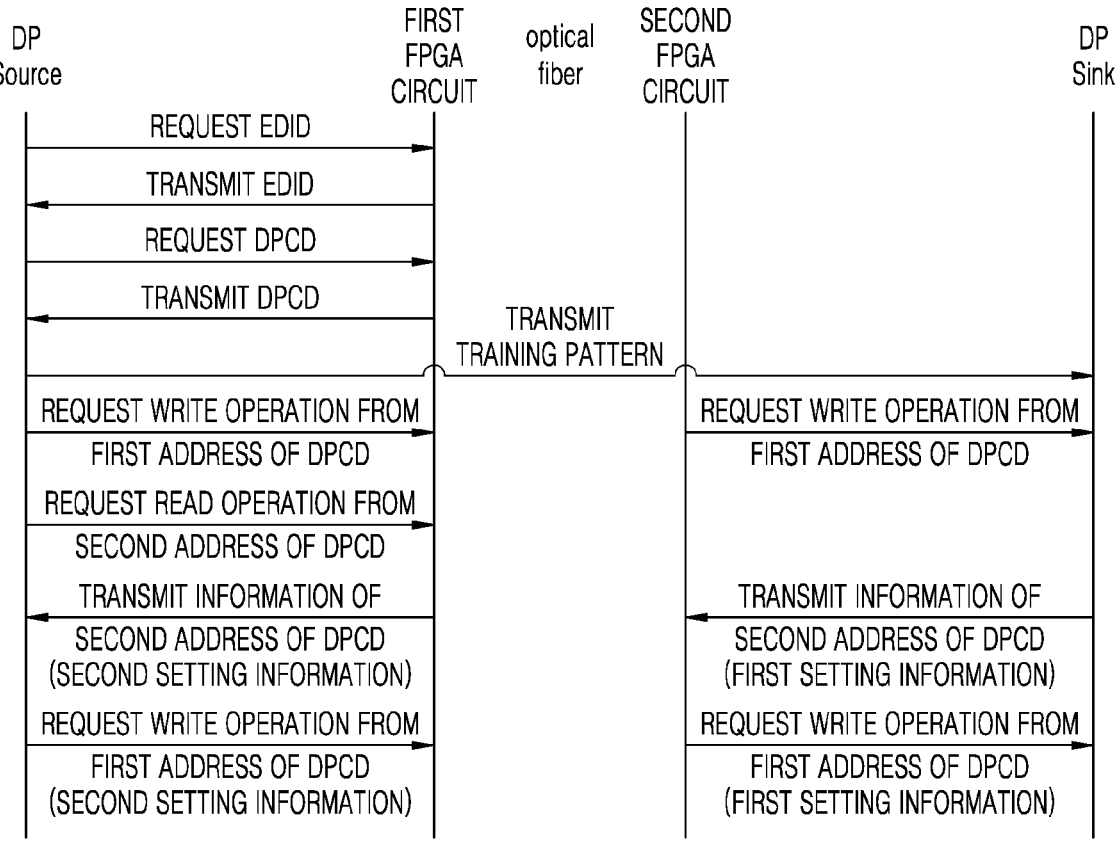
FIG. 27 is a schematic diagram of a rapid transmission of EDID information and DPCD information in response to a request of the EDID information and the DPCD information between a display source and a display sink through the storage and transmission of relevant data of first and second FPGA circuits.

FIG. 27 is a schematic diagram of a rapid transmission of EDID information and DPCD information in response to a request of the EDID information and the DPCD information between a display source and a display sink through the storage and transmission of relevant data of first and second FPGA circuits.

The FPGA circuit may store the EDID information related to rendering of the display sink and the DPCD information with respect to setting of the main link Lane, and despite an environmental change of the display sink, may not go through, from the start again, hand shaking for the EDID information or link training for the setting of the main link Lane and may rightly transmit, based on the stored rendering data (the EDID information) and the stored data with respect to the setting of the main link Lane (the information of the DPCD register), the main data including video information, as the environment of the display sink is normalized.

For example, the FPGA circuit may store the EDID information provided from the display sink in the initial operation between the display source and the display sink and may store the information (the information of the DPCD register) exchanged between the display source and the display sink with respect to setting of the training pattern in the link training. According to an embodiment, the FPGA circuit may ignore an HPD signal with respect to an environmental change of the display sink, which is transmitted from the HPD line, for example, the HPD signal corresponding to an interrupt signal for notifying disconnection from the display source or re-requesting setting of the main link Lane, and the FPGA circuit may transmit a faked HPD signal corresponding to a normal connection state, and thus, the display source may not sense the environmental change of the display sink and according to the faked hot plug signal, may not return to the initial connection state and resume the link training for the setting of the EDID information and the main link Lane, despite the environmental change of the display sink.

For example, the display port may transmit the main data in a packet form, whereby address information is assigned to each packet, rather than a continuous data flow, and thus, one to multi-display connection in which one display source is connected to a plurality of display sinks may be supported, and an intermediate hub between the display source and the display sink may distribute the main data in the packet form to each of the display sinks by referring to the address information included in a header of each packet. According to various embodiments, a plurality of terminals may be prepared so that a plurality of main links Lanes and a plurality of auxiliary channels AUX channels may be connected to one display source. Thus, a plurality of display port systems in which one display source is repeatedly paired with each display sink or a multi-display port system or multi-display including the plurality of display port systems may be formed.

In this one-to-multi display, when an HPD signal according to a change of an environment is received from any one of the plurality of display sinks connected to one display source, the user's setting with respect to the entire display sinks may be dislocated, and thus, the video output with respect to the entire display sinks may be affected. Thus, according to an embodiment, a change of the HPD signal received from the display sink, for example, transition from a high signal to a low signal, may be ignored, and a faked HPD signal forcibly maintaining the HPD signal as the high signal may be generated and transmitted to the display source, so that the display source may not sense the change of the environment of the display sink. Thus, the main data may be transmitted based on the previous EDID information and DPCD information, and video outputs of the remaining display sinks from among the plurality of display sinks, except for the one display sink in which the change of the environmental occurs, may not be affected by the change of the connection state of the one display sink and may be normally performed.

According to an embodiment, also in the one-to-one connection of one display source and one display sink, the HPD from the display sink in which the change of the environment occurs may be ignored and the faked HPD signal may be generated, and thus, the setting of the main line Lane based on the previous EDID information and DPCD information may be intactly maintained. Thus, when the display sink is re-connected, the hand shaking or the link training for the setting of the EDID information and the setting of the DPCD information may not be resumed.

According to an embodiment, the FPGA circuit may identify the auxiliary data exchanged through the auxiliary channel AUX channel and may store the EDID information transmitted from the display sink in the hand shaking and the information of the auxiliary data with respect to the setting of the main link Lane of the DPCD register between the display source and the display sink in the link training. Also, the FPGA circuit may replace the HPD signal with respect to a change of the environment in the display sink by the generated faked HPD signal (forcibly maintaining the HPD signal as the high signal) and transmit the faked HPD signal to the display source.

For example, according to an embodiment, the EDID information related to the rendering of the display sink, such as a resolution and a scan rate, and the information of the DPCD register with respect to the setting of the main link Lane may be stored in both of the first FPGA circuit of the display source and the second FPGA circuit of the display source.

According to various embodiments, the FPGA circuit may replace the HPD signal with respect to the change of the environment in the display sink by the faked HPD signal forcibly maintaining the HPD signal as the previous high signal and may transmit the faked HPD signal to the display source, so as to maintain the main link Lane according to the previous EDID information and the previous DPCD information. Thus, with respect to the display sink reconnected to have the normal environment, the display source may transmit the main data without requesting the hand shaking or the link training.

As described above, according to an embodiment, the HPD signal from the display source and the HPD signal from the display sink may be formed as different signals from each other through the optical link. According to an embodiment, the display source and the display sink may be optically coupled with each other through the optical link. For example, the display source and the display sink may not form conductive connection through metal conductive lines sharing the same voltage level, and thus, according to the disclosure, to which the optical link is applied, the HPD signal from the display source and the HPD signal from the display sink, the display source and the display sink being optically coupled to each other, may be formed as the different signals from each other.

As described above, even when, despite the change of the environment of the display sink, the display source is forcibly made to maintain the connection state (for the re-connection, setting of the main link is not performed) by maintaining the HPD signal from the display sink and the HPD signal from the display source to be different from each other, the FPGA circuit may store the previous EDID information the previous DPCD information and may use the stored EDID information and DPCD information to rapidly transmit, to the display source, the EDID information and the DPCD information in which the first FPGA circuit connected to be adjacent to the display source is stored, without being needed to transmit the request from the reconnected display sink or display source to the other display sink or display source, for example, without being needed to transmit the request by the display source to the display sink, and similarly to rapidly transmit, to the display sink, the EDID information and the DPCD information in which the second FPGA circuit connected to be adjacent to the display sink is stored, without transmitting the request by the display sink to the display source (For example, with respect to the write request by the display source with respect to the first address of the DPCD, the second FPGA circuit may, on behalf of the display source, request the write operation from the display sink by using the stored DPCD information).

According to various embodiments, while the FPGA circuit may intactly transmit the HPD signal with respect to the change of the environment of the display sink to the display source, the FPGA circuit may use, with respect to the display sink that is reconnected with the normal environment, the previous EDID information and the previous DPCD information that are stored in the hand shaking or the link training resumed by the display source, so as to rapidly transmit the stored previous EDID information and the stored previous DPCD information to the display source without being needed to transmit the request from the display source to the display sink. For example, the FPGA circuit may transmit the relevant information stored in the first FPGA circuit connected to be adjacent to the display source to the display source in response to the request by the display source and may transmit the relevant information stored in the second FPGA circuit connected to be adjacent to the display sink to the display sink in response to the request by the display sink. Thus, the exchanging of the relevant information may be rapidly performed, without data transfer through the optical fiber of the optical link.

For example, in the link training, the FPGA circuit may replace the information with respect to the setting of the training pattern, initially requested by the display sink (the first setting information/the read operation with respect to the second address of the DPCD register), by the information optimized for the optical link (the second setting information), and thus, may write the setting complying with the request by the display sink (the first setting information), in the DPCD register of the display sink (the write operation with respect to the first address of the DPCD register). That is, while the information with respect to the setting of the training pattern (the setting of the main link) recognized by the display source (the second setting information) may be the setting optimized for the optical link, the information with respect to the setting of the training pattern recognized by the display sink (the first setting information) may be the setting requested by the display sink. Thus, the information with respect to the setting of the main link Lane or the information of the DPCD register, recognized by each of the display source and the display sink, may not correspond to each other (the different first and second setting information). Here, when the HPD signal of the display sink with respect to the change of the environment occurs, the first FPGA circuit connected to be adjacent to the display source may store the optimized setting for the optical link as the information with respect to the setting of the main link Lane recognized by the display source (the second setting information), and unlike this, the second FPGA circuit connected to be adjacent to the display sink may store the information with respect to the setting of the main link Lane or the information of the DPCD register requested by the second FPGA circuit as the information with respect to the setting of the main link Lane recognized by the display sink (the first setting information). Also, when the display sink is reconnected as the normal environment, in response to the request by the display source, the first FPGA circuit connected to be adjacent to the display source may transmit the stored information (the second setting information) to the display source, and in response to the request by the display sink, the second FPGA circuit connected to be adjacent to the display sink may transmit the stored information (the first setting information) to the display sink.

According to an embodiment, after the main data is transmitted by setting the main link Lane according to the EDID information and the DPCD information determined through hand shaking and link training from initial connection between the display source and the display sink, that is, after a first video frame is output or the main data with respect to the first video frame is received, the FPGA circuit may store the EDID information and the DPCD information and may store the EDID information and the DPCD information in which the setting of the main link Lane is determined as the main data is transmitted.

However, the EDID data related to display rendering, such as the resolution and the scan rate, may be changed by reflecting a taste or preference of a user according to the setting of the user, unlike the DPCD information or the DPCD register information with respect to the setting of the main link Lane. Thus, when the EDID information is changed according to a subsequent setting of the user, the FPGA circuit may update the EDID information as the changed EDID information, even when the EDID information is stored after the first video frame is output or the main data with respect to the first video frame is received.

For reference, the FPGA circuit, the first FPGA circuit, and the second FPGA circuit that are illustrated in this specification may be examples of a control logic circuit of the optical link forming the auxiliary channel for transmitting the auxiliary data between the display source and the display sink, and for example, may read content of the auxiliary data, generate necessary control signals, or store the necessary auxiliary data. Also, as the examples of the control logic circuit generally in charge of overall control operations of the optical link, such as an operation of changing some content of the auxiliary data, etc., the technical scope of the specification is not limited to the FPGA circuit, the first FPGA circuit, and the second FPGA circuit as described above. Other structures capable of controlling the general operations of the optical link may correspond to the FPGA circuit, the first FPGA circuit, and the second FPGA circuit described in this specification. In this sense, the FPGA circuit, the first FPGA circuit, and the second FPGA circuit may be collectively understood as the control logic circuit, a first control logic circuit, and a second control logic circuit, respectively, and the control logic circuit, the first control logic circuit, and the second control logic circuit described in the claims may include the FPGA circuit, the first FPGA circuit, and the second FPGA circuit described in the specification, respectively. Similarly, the first and second FPGA chips may be understood as first and second control logic circuits or first and second control logic chips, respectively, and the first and second control logic chips described in the claims may include the first and second FPGA circuits, respectively, or the first and second FPGA chips, respectively.

According to the optical link according to the disclosure, there is provided the optical link supporting duplex communication of the auxiliary channel for transmitting, between the display source and the display sink, the EDID that is related to rendering of the display sink or the DPCD related to setting of the main link.

According to the optical link according to the disclosure, in the link training between the display source and the display sink, the main link may be set as the setting optimized for the optical link that is different from the request by the display sink with respect to the setting of the training pattern, and thus, the optical link may prevent a data transfer error, despite a transmission delay or distortion due to the movement of the optical link, such as non-linearity between an input and an output of the modulation and the demodulation.

According to the optical link according to the disclosure, in one-to-multi display in which a plurality of display sinks are connected to one display source, dislocation or instability of the arrangement of a plurality of screens, which may be caused by a change in a connection state of any one display sink, may be prevented, and after the display sink returns to a normal connection state, delay of a video output for the resetting of the main link may be prevented.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope as defined by the following claims.

What is claimed is:

1. An optical link connected between a display source and a display sink forming a display port system, the optical link forming a main link for transmitting main data including video information, an auxiliary channel for transmitting auxiliary data for setting of the main link and a hot plug detection (HPD) line for transmitting an HPD signal of the display sink, wherein the auxiliary channel comprises:
a first transmission line configured to transmit a request by the display source from the display source to the display sink, and a second transmission line configured to transmit a response by the display sink from the display sink to the display source, and
the optical link is configured to:
i) prior to the request by the display source, transmit a second control signal for switching a connection of the display sink from the second transmission line to the first transmission line; and
ii) prior to the response by the display sink, transmit a first control signal for switching a connection of the display source from the first transmission line to the second transmission line,
wherein the optical link further comprises;
a first control logic connected to be adjacent to the display source and configured to transmit the first control signal; and
a second control logic circuit connected to be adjacent to the display sink and configured to transmit the second control signal, wherein the first control logic circuit is configured to delay the request by the display source and transmit the second control signal prior to the request by the display source, and
the second control logic circuit is configured to delay the response by the display sink and transmit the first control signal prior to the response by the display sink, and
wherein the first control logic circuit stores the auxiliary data related to the rendering of the display sink and the auxiliary data with respect to the setting of the main link, and when the HPD signal is recovered according to normal reconnection of the display sink after a change in the HPD signal according to a connection state of the display sink, the first control logic circuit transmits the stored auxiliary data related to the rendering of the display sink and the stored auxiliary data with respect to the setting of the main link toward the display source in response to the request of the display source.

2. The optical link of claim 1, wherein the request by the display source and the second control signal prior to the request by the display source are transmitted to the display sink through the first transmission line; and
the response by the display sink and the first control signal prior to the response by the display sink are transmitted to the display source through the second transmission line.

3. The optical link of claim 1, further comprising:
a first multiplexer configured to switch a connection between the display source and the first and second transmission lines; and
a second multiplexer configured to switch a connection between the display sink and the first and second transmission lines.

4. The optical link of claim 3, wherein by transmitting the first control signal to the first multiplexer, the connection of the display source is switched to the second transmission line to receive the response by the display sink; and
by transmitting the second control signal to the second multiplexer, the connection of the display sink is switched to the first transmission line to receive the request by the display source.

5. The optical link of claim 3, wherein, when the first control signal is not transmitted to the first multiplexer, the first multiplexer maintains a connection with the first transmission line so as to transmit the request by the display source, and
when the second control signal is not transmitted to the second multiplexer, the second multiplexer maintains a connection with the second transmission line so as to transmit the response by the display sink.

6. The optical link of claim 3, wherein the first and second control logic circuits are connected at inner ends with respect to the first and second multiplexers, between the display source and the display sink in order to receive the first and second control signals prior to the first and second multiplexers.

7. The optical link of claim 3, wherein the first control logic circuit is connected to both of the first and second transmission lines regardless of a connection state of the first multiplexer, in order to receive the request by the display source, the request being transmitted through the first transmission line, and to receive the first control signal transmitted through the second transmission line, and
the second control logic circuit is connected to both of the first and second transmission lines regardless of a connection state of the second multiplexer, in order to receive the response by the display sink, the response being transmitted through the second transmission line, and to receive the second control signal transmitted through the first transmission line.

8. The optical link of claim 3, wherein, when the first control signal is received through the second transmission line while the request by the display source is being transmitted through the first transmission line, the first control logic circuit is configured not to transmit the first control signal to the first multiplexer to prioritize the request by the display source, and, when the second control signal is received through the first transmission line while the response by the display sink is being transmitted through the second transmission line, the second control logic circuit is configured to transmit the second control signal to the second multiplexer to prioritize the second control signal.

9. The optical link of claim 3, wherein the first control logic circuit is configured to receive the first control signal transmitted from a front end of the first multiplexer through the second transmission line and transmit the received first control signal to the first multiplexer at a back end, and the second control logic circuit is configured to receive the second control signal transmitted from a front end of the second multiplexer through the first transmission line and transmit the received second control signal to the second multiplexer at a back end.

10. The optical link of claim 1, wherein the first control logic circuit includes a first control logic chip separately including an input and output terminal connected to the first transmission line and an input and output terminal connected to the second transmission line, wherein the first control logic circuit is configured to process, in parallel, the request by the display source transmitted through the first transmission line and the first control signal transmitted through the second transmission line, and the second control logic circuit includes a second control logic chip separately including an input and output terminal connected to the first transmission line and an input and output terminal connected to the second transmission line, wherein the second control logic circuit is configured to process, in parallel, the second control signal transmitted through the first transmission line and the response by the display sink transmitted through the second transmission line.

11. The optical link of claim 1, wherein the request by the display source and the response by the display sink are a request for display port configuration data (DPCD) and a response to the request for the DPCD, in link training for the setting of the main link.

12. The optical link of claim 1, wherein a clock signal is recovered by using a pre-charge pattern prior to the request and the response by the display source and the display sink, and data of the request and the response by the display source and the display sink is quantized into recognizable binary data by matching the data with the recovered clock signal.

13. The optical link of claim 12, wherein the pre-charge pattern is maintained to be shorter than or equal to a sync pattern for synchronization following the pre-charge pattern.

14. The optical link of claim 12, wherein the auxiliary channel is alternating current (AC)-coupled.

* * * * *